US010716061B2

(12) United States Patent
Park et al.

(10) Patent No.: US 10,716,061 B2
(45) Date of Patent: *Jul. 14, 2020

(54) METHOD AND DEVICE FOR TRIGGERING PLURALITY OF PS-POLL FRAMES IN WIRELESS LAN

(71) Applicant: LG ELECTRONICS INC., Seoul (KR)

(72) Inventors: Giwon Park, Seoul (KR); Kiseon Ryu, Seoul (KR); Jeongki Kim, Seoul (KR); Hangyu Cho, Seoul (KR); Suhwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/441,817

(22) Filed: Jun. 14, 2019

(65) Prior Publication Data

US 2019/0297567 A1    Sep. 26, 2019

Related U.S. Application Data

(63) Continuation of application No. 15/508,457, filed as application No. PCT/KR2015/009250 on Sep. 2, 2015, now Pat. No. 10,356,711.

(Continued)

(51) Int. Cl.
*H04W 52/02* (2009.01)
*H04W 74/06* (2009.01)
(Continued)

(52) U.S. Cl.
CPC ............ *H04W 52/02* (2013.01); *H04W 4/06* (2013.01); *H04W 74/06* (2013.01); *H04W 84/12* (2013.01);
(Continued)

(58) Field of Classification Search
CPC ....... H04W 52/02; H04W 4/06; H04W 74/06; H04W 84/12; H04W 88/08; Y02D 70/00; Y02D 70/21; Y02D 70/22; Y02D 70/142
See application file for complete search history.

(56) References Cited

U.S. PATENT DOCUMENTS

2010/0214942 A1   8/2010  Du et al.
2014/0086131 A1   3/2014  Seok et al.
(Continued)

FOREIGN PATENT DOCUMENTS

WO    2013155990    10/2013
WO    2014074832     5/2014
WO    2014107031     7/2014

OTHER PUBLICATIONS

European Patent Office Application Serial No. 15795100.5, Search Report dated Mar. 15, 2018, 10 pages.
(Continued)

*Primary Examiner* — Ian N Moore
*Assistant Examiner* — Brian T Le
(74) *Attorney, Agent, or Firm* — Lee Hong Degerman Kang & Waimey

(57) ABSTRACT

Disclosed are a method and a device for triggering a plurality of PS-poll frames in a wireless LAN. The method for triggering a plurality of PS-poll frames in a wireless LAN can comprise the steps of: transmitting, by an AP, a beacon frame; transmitting, by the AP, a first PS-poll trigger frame within a beacon interval; receiving, by the AP, a plurality of first PS-poll frames transmitted on the basis of a UL MU transmission by a first STA group as a response to the first PS-poll trigger frame; transmitting, by the AP, a plurality of first downlink data frames to a plurality of STAs on the basis of a DL MU transmission as a response to the plurality of first PS-poll frames; transmitting, by the AP, a second PS-poll trigger frame within a beacon interval;
(Continued)

receiving, by the AP, a plurality of second PS-poll frames transmitted on the basis of the UL MU transmission by a second STA group as a response to the second PS-poll trigger frame; and transmitting, by the AP, a plurality of second downlink data frames to the plurality of STAs on the basis of the DL MU transmission as a response to the plurality of second PS-poll frames.

8 Claims, 21 Drawing Sheets

Related U.S. Application Data

(60) Provisional application No. 62/077,910, filed on Nov. 11, 2014, provisional application No. 62/066,888, filed on Oct. 21, 2014, provisional application No. 62/045,571, filed on Sep. 4, 2014.

(51) Int. Cl.
    *H04W 84/12*     (2009.01)
    *H04W 4/06*     (2009.01)
    *H04W 88/08*     (2009.01)

(52) U.S. Cl.
    CPC ............ *H04W 88/08* (2013.01); *Y02D 70/00* (2018.01); *Y02D 70/142* (2018.01); *Y02D 70/21* (2018.01); *Y02D 70/22* (2018.01)

(56) References Cited

U.S. PATENT DOCUMENTS

| | | |
|---|---|---|
| 2014/0177616 A1 | 6/2014 | Seok |
| 2014/0192742 A1 | 7/2014 | Gong et al. |
| 2016/0037484 A1* | 2/2016 | Kwon ................. H04W 72/005 370/312 |
| 2017/0280383 A1 | 9/2017 | Park et al. |

OTHER PUBLICATIONS

PCT International Application No. PCT/KR2015/009250, International Search Report dated Dec. 28, 2015, 2 pages.

"IEEE Standard for Information Technology, Telecommunications and information exchange between systems, Local and metropolitan area networks, Specific requirements, Part 11: Wireless LAN Medium Access Control (MAC) and Physical Layer (PHY) Specifications", IEEE Draft P802.11-REVmb™/D12, section 8.3.3.2., pp. 6 pages.

"IEEE Standard for Information Technology, Telecommunications and information exchange between systems, Local and metropolitan area networks, Specific requirements, Part 11: Wireless LAN Medium Access Control (MAC) and Physical Layer (PHY) Specifications", IEEE Draft P802.11-REVmb™/D12, section 8.3.3.5.-8.3.3.6., 3 pages.

"IEEE Standard for Information Technology, Telecommunications and information exchange between systems, Local and metropolitan area networks, Specific requirements, Part 11: Wireless LAN Medium Access Control (MAC) and Physical Layer (PHY) Specifications", IEEE Draft P802.11-REVmb™/D12, section 8.3.3.9., 3 pages.

"IEEE Standard for Information Technology, Telecommunications and information exchange between systems, Local and metropolitan area networks, Specific requirements, Part 11: Wireless LAN Medium Access Control (MAC) and Physical Layer (PHY) Specifications", IEEE Draft P802.11-REVmb™/D12, section 8.3.3.10., 5 pages.

"IEEE Standard for Information Technology, Telecommunications and information exchange between systems, Local and metropolitan area networks, Specific requirements, Part 11: Wireless LAN Medium Access Control (MAC) and Physical Layer (PHY) Specifications", IEEE Draft P802.11-REVmb™/D12, section 8.3.3.11., 3 pages.

* cited by examiner

FIG. 1
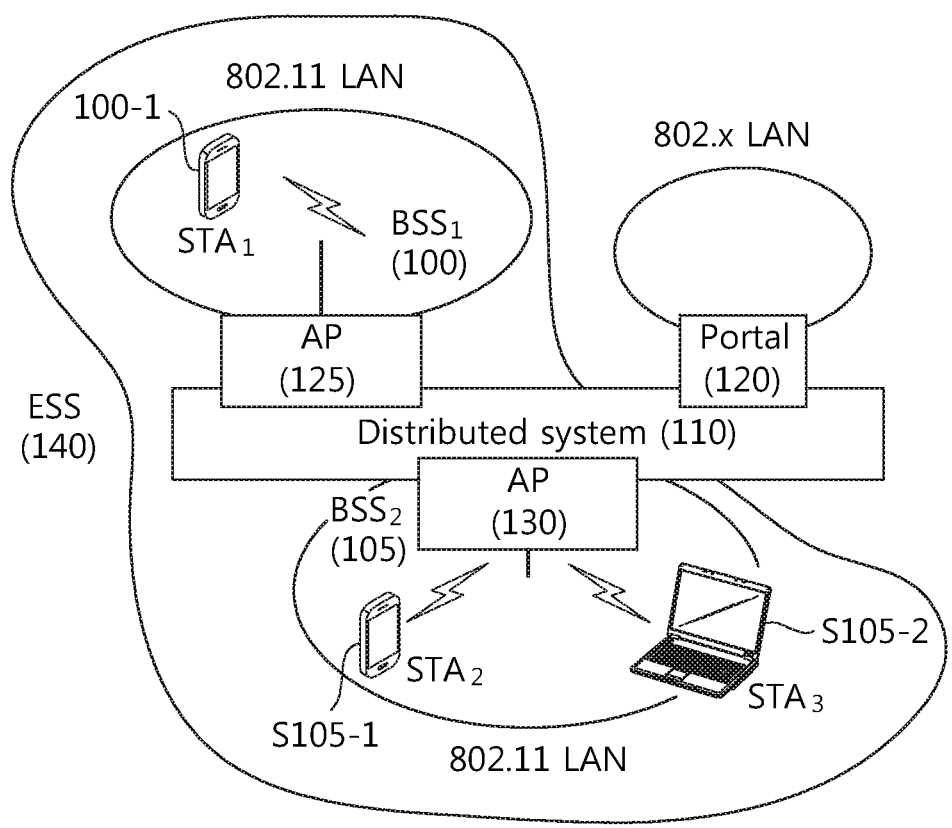
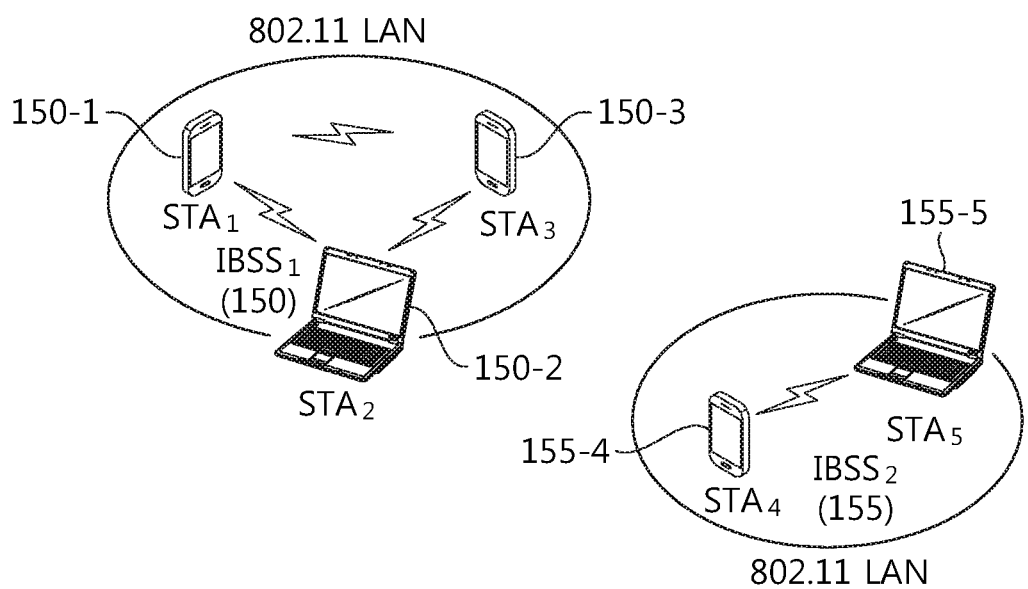

METHOD AND DEVICE FOR TRIGGERING
PLURALITY OF PS-POLL FRAMES IN
WIRELESS LAN

CROSS-REFERENCE TO RELATED APPLICATIONS

This application is a continuation of U.S. patent application Ser. No. 15/508,457, filed on Mar. 2, 2017, now U.S. Pat. No. 10,356,711, which is the National Stage filing under 35 U.S.C. 371 of International Application No. PCT/KR2015/009250, filed on Sep. 2, 2015, which claims the benefit of U.S. Provisional Applications No. 62/045,571, filed on Sep. 4, 2014, 62/066,888, filed on Oct. 21, 2014 and 62/077,910, filed on Nov. 11, 2014, the contents of which are all hereby incorporated by reference herein in their entirety.

BACKGROUND OF THE INVENTION

Field of the Invention

The present invention relates to wireless communication, and more particularly to a method for triggering plural PS-poll frames in a wireless local area network (WLAN).

Related Art

A next generation wireless local area network (WLAN) has been discussed. The next generation WLAN is aimed at 1) improving IEEE (institute of electronic and electronics engineers) 802.11 PHY (physical) layer and MAC (medium access control) layer, 2) increasing spectrum efficiency and area throughput, and 3) improving performance in real internal and external environments such as an environment having an interference source, a dense heterogeneous network environment, and an environment having a high user load.

In the next generation WLAN, a dense environment having a plurality of APs (access points) and a plurality of STAs (stations) is mainly considered. Improvement in a spectrum efficiency and area throughput in the dense environment is discussed. Further, in the next generation WLAN, substantial performance improvement in an outdoor environment which is not significantly considered in an existing WLAN as well as an indoor environment is spotlighted.

In detail, in the next generation WLAN, a scenario such as a wireless office, a smart home, a Stadium, a Hotspot, and building/apartment has been spotlighted. Improvement in the system performance in a dense environment having a plurality of APs and STAs has been discussed based on a corresponding scenario.

In addition, it is expected that discussion with respect to system performance improvement in an overlapping basic service set (OBSS) and an outdoor environment performance improvement, and cellular offloading is active as compared with a single link performance improvement in one basic service set (BSS). Directionality of the above next generation WLAN means that the next generation WLAN gradually includes a technical range similar to mobile communication. In recently, when considering a situation in which mobile communication and a WLAN technology are simultaneously discussed in a small cell and a Direct-to-Direct (D2D) communication area.

SUMMARY OF THE INVENTION

The present invention provides a method for triggering a plurality of PS-poll frame in a WLAN.

The present invention further provides an apparatus for triggering a plurality of PS-poll frame in a WLAN.

A method of triggering of a plurality of power save (PS)-poll frame in wireless local area network (WLAN) according to an aspect of the present invention includes: transmitting, by an access point (AP), a beacon frame, transmitting, by the AP, a first PS-poll trigger frame during a beacon interval, receiving, by the AP, a plurality of first PS-poll frames transmitted based on a uplink (UL) multi-user (MU) transmission as a response to the first PS-poll trigger frame by a first station (STA) group, transmitting, by the AP, a plurality of first downlink data frames based on a downlink (DL) multi-user (MU) transmission as a response to the plurality of the first PS-poll frames, transmitting, by the AP, a second PS-poll trigger frame during the beacon interval, receiving, by the AP, a plurality of second PS-poll frames transmitted based on the UL MU transmission as a response to the second PS-poll trigger frame by a second STA group and transmitting, by the AP, a plurality of second downlink data frames based on the DL MU transmission as a response to the plurality of the second PS-poll frames.

Further, the beacon frame includes transmission time offset information and the transmission time offset information includes information related to a transmission time of the first PS-poll trigger frame and information related to a transmission time of the second PS-poll trigger frame.

Further, the beacon frame includes trigger frame indicator bitmap, the trigger frame indicator bitmap includes a plurality of trigger frame indicators and the plurality of trigger frame indicators determines the first STA group and the second STA group.

Further, the beacon frame includes a virtual traffic indicator bitmap and each of a plurality of positive traffic indicator bit included in the virtual traffic indicator bitmap corresponds to the plurality of trigger frame indicators in order.

Further, the beacon frame includes a virtual traffic indicator bitmap and a location of each of a plurality of positive traffic indicator bit included in the virtual traffic indicator bitmap determines the first STA group and the second STA group.

An AP triggering of a plurality of power save (PS)-poll frame in wireless local area network (WLAN) according to another aspect of the present invention includes a radio frequency (RF) unit configured to transmit or receive radio signal and a processor operatively connected to the RF unit and configured to transmit a beacon frame, transmit a first PS-poll trigger frame during a beacon interval, receive a plurality of first PS-poll frames transmitted based on a uplink (UL) multi-user (MU) transmission as a response to the first PS-poll trigger frame by a first station (STA) group, transmit a plurality of first downlink data frames based on a downlink (DL) multi-user (MU) transmission as a response to the plurality of the first PS-poll frames, transmit a second PS-poll trigger frame during the beacon interval, receive a plurality of second PS-poll frames transmitted based on the UL MU transmission as a response to the second PS-poll trigger frame by a second STA group, and transmit a plurality of second downlink data frames based on the DL MU transmission as a response to the plurality of the second PS-poll frames.

Further, the beacon frame includes transmission time offset information and the transmission time offset information includes information related to a transmission time of the first PS-poll trigger frame and information related to a transmission time of the second PS-poll trigger frame.

Further, the beacon frame includes trigger frame indicator bitmap, the trigger frame indicator bitmap includes a plurality of trigger frame indicators and the plurality of trigger frame indicators determines the first STA group and the second STA group.

Further, the beacon frame includes a virtual traffic indicator bitmap and each of a plurality of positive traffic indicator bit included in the virtual traffic indicator bitmap corresponds to the plurality of trigger frame indicators in order.

Further, the beacon frame includes a virtual traffic indicator bitmap and a location of each of a plurality of positive traffic indicator bit included in the virtual traffic indicator bitmap determines the first STA group and the second STA group.

Based on trigger of the plurality of PS-poll frames of the access point (AP), pending downlink data with respect to a plurality of STAs may be transmitted based on downlink (DL) multi-user (MU) transmission. Accordingly, the efficiency and throughput of the WLAN may be improved.

BRIEF DESCRIPTION OF THE DRAWINGS

FIG. 1 is a concept view illustrating the structure of a wireless local area network (WLAN).

DESCRIPTION OF EXEMPLARY EMBODIMENTS

FIG. 1 is a concept view illustrating the structure of a wireless local area network (WLAN).

An upper part of FIG. 1 shows the structure of the IEEE (institute of electrical and electronic engineers) 802.11 infrastructure BSS (basic service set).

Referring to the upper part of FIG. 1, the WLAN system may include one or more infrastructure BSS 100 and 105 (infrastructure BSS can be represented as BSS). The BSS 100 or 105 is a set of an AP such as AP (access point) 125 and an STA such as STA1 (station) 100-1 that may successfully sync with each other to communicate with each other and is not the concept to indicate a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 130 connected via the distribution system 110. The APs included in one ESS 140 may have the same SSID (service set identification).

The portal 120 may function as a bridge that performs connection of the WLAN network (IEEE 802.11) with other network (for example, 802.X).

In the BSS as shown in the upper part of FIG. 1, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent BSS (basic service set).

A lower part of FIG. 1 is a concept view illustrating an independent BSS.

Referring to the lower part of FIG. 1, the independent BSS (IBSS) is a BSS operating in ad-hoc mode. The IBSS does not include an AP, so that it lacks a centralized management entity. In other words, in the IBSS, the STAs 150-1, 150-2, 150-3, 155-4 and 155-5 are managed in a distributed manner. In the IBSS, all of the STAs 150-1, 150-2, 150-3, 155-4 and 155-5 may be mobile STAs, and access to the distribution system is not allowed so that the IBSS forms a self-contained network.

The STA is some functional medium that includes a medium access control (MAC) following the IEEE (Institute of Electrical and Electronics Engineers) 802.11 standards and that includes a physical layer interface for radio media, and the term "STA" may, in its definition, include both an AP and a non-AP STA (station).

The STA may be referred to by various terms such as mobile terminal, wireless device, wireless transmit/receive unit (WTRU), user equipment (UE), mobile station (MS), mobile subscriber unit, or simply referred to as a user.

Figure 2:
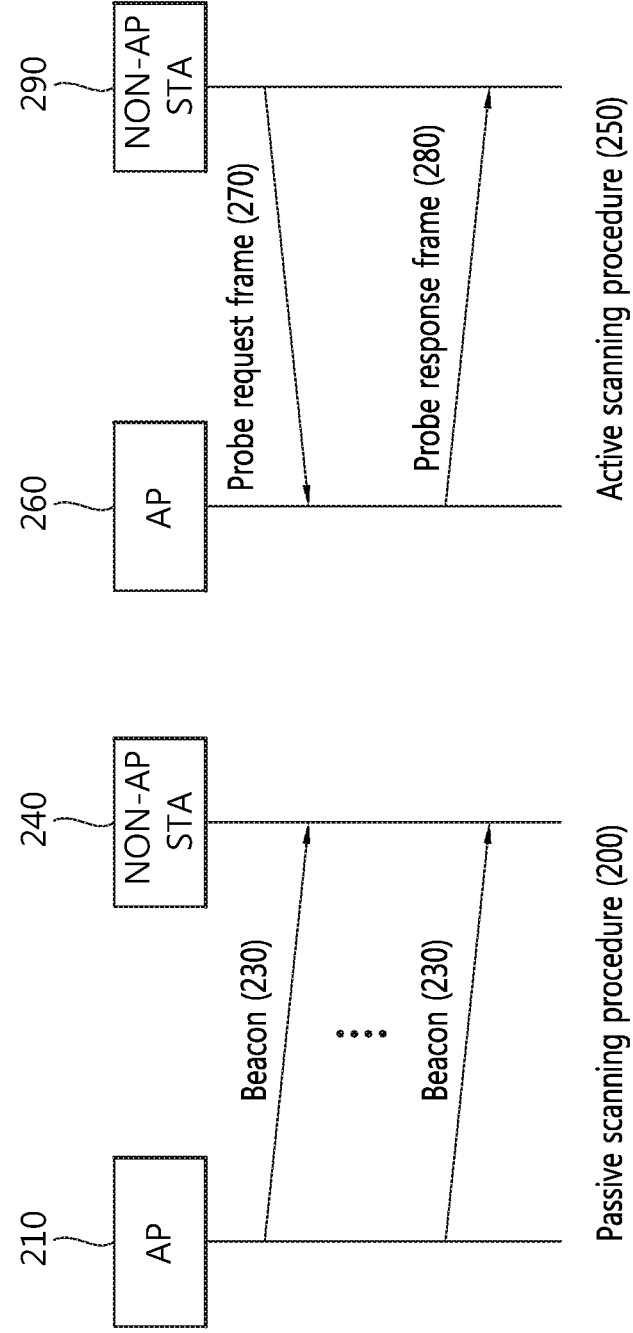
FIG. 2 is a concept view illustrating a scanning method in a WLAN.

FIG. 2 is a concept view illustrating a scanning method in a WLAN.

Referring to FIG. 2, the scanning method may be divided into passive scanning 200 and active scanning 250.

Referring to a left part of FIG. 2, the passive scanning 200 may be performed by a beacon frame 230 that is periodically broadcast from the AP 210. The AP 210 in the WLAN broadcasts the beacon frame 230 to the non-AP STA 240 at a particular period (e.g., per 100 msec). The beacon frame 230 may contain information on the current network. The non-AP STA 240 may perform scanning on the channel with the AP 210 to perform the authentication/association process (or procedure) by obtaining the network information from the beacon frame 230 periodically broadcast.

The passive scanning method 200 only receives the beacon frame 230 transmitted from the AP 210 without the need for the non-AP STA 240 to transmit a frame. Accordingly, the passive scanning 200 is advantageous of a reduction in the overall overhead that is created upon data transmission/reception over the network. However, since the scanning is obliged to be passively performed in proportion to the period of the beacon frame 230, the time taken to perform scanning may be increased. The details of the beacon frame are set forth in IEEE Draft P802.11-REVmb™/D12, November 2011 'IEEE Standard for Information Technology Telecommunications and information exchange between systems—Local and metropolitan area networks—Specific requirements Part 11: Wireless LAN Medium Access Control (MAC) and Physical Layer (PHY) Specifications (hereinafter, IEEE 802.11)' 8.3.3.2 beacon frame disclosed on November, 2011.

Referring to a right part of FIG. 2, the active scanning 250 refers to a method in which the non-AP STA 290 leads scanning by transmitting a probe request frame 270 to the AP 260.

After receiving the probe request frame 270 from the non-AP STA 290, the AP 260 may wait a random time to prevent frame collision, and the AP 260 then includes network information in a frame response frame 280, then sending the same to the non-AP STA 290. The non-AP STA 290 may obtain the network information based on the received probe response frame 280 to stop the scanning process.

The active scanning 250 allows the non-AP STA 290 to lead the scanning process, and the active scanning 250 has the advantage of a short scanning time. However, the non-AP STA 290 should transmit the probe request frame 270, resulting in an increase in the network overhead for frame transmission and reception. The probe request frame 270 is set forth in IEEE 802.11 Ch. 8.3.3.9, and the probe response frame 280 is set forth in IEEE 802.11 Ch. 8.3.3.10.

After the scanning is done, the AP and the STA may conduct an authentication and association procedure.

Figure 3:
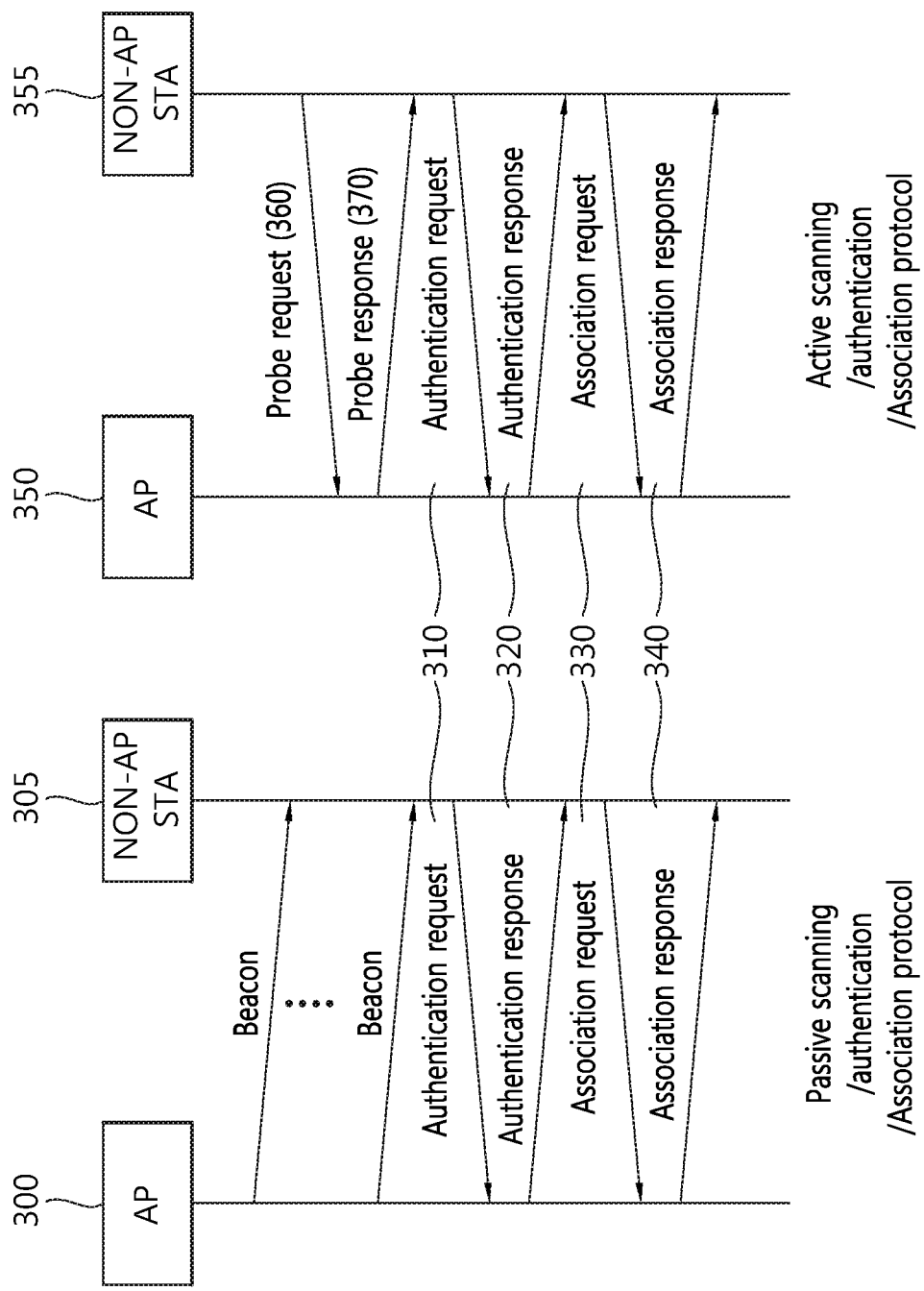
FIG. 3 is a concept view illustrating an authentication and association process after scanning between an AP and an STA.

FIG. 3 is a concept view illustrating an authentication and association process after scanning between an AP and an STA.

Referring to FIG. 3, after passive/active scanning, the authentication procedure and association procedure may be conducted with one of the scanned APs.

The authentication and association procedure may be carried out by way of, e.g., 2-way handshaking. A left part of FIG. 3 is a concept view illustrating an authentication procedure and an association process after passive scanning, and a right part of FIG. 3 is a concept view illustrating an authentication procedure and an association procedure after active scanning.

The authentication procedure and the association procedure may be equally performed by exchanging an authentication request frame 310/authentication response frame 320 and an association request frame 330/association response frame 340 between the AP 300 or 350 and the non-AP STA 305 or 355 regardless of which one of the active scanning method and the passive scanning method has been used.

The authentication procedure may be conducted by transmitting the authentication request frame 310 from the non-AP STA 305 or 355 to the AP 300 or 350. In response to the authentication request frame 310, the authentication response frame 320 may be transmitted from the AP 300 or 350 to the non-AP STA 305 or 355. The authentication frame format is set forth in IEEE 802.11 Ch. 8.3.3.11.

The association procedure may be conducted by transmitting the association request frame 330 from the non-AP STA 305 or 355 to the AP 300 or 305. In response to the association request frame 330, the association response frame 340 may be transmitted from the AP 300 or 350 to the non-AP STA 305 or 355. The transmitted association request frame 330 contains information on the capability of the non-AP STA 305 or 355. Based on the information on the capability of the non-AP STA 305 or 355, the AP 300 or 350 may determine whether the non-AP STA 305 or 355 may be supported. In case the support for the non-AP STA 305 or 355 is possible, the AP 300 or 350 may include in the association response frame 340 whether to accept the association request frame 330 and a reason therefore, and its supportable capability information, and the AP 300 or 350 may send the same to the non-AP STA 305 or 355. The association frame format is set forth in IEEE 802.11 Chs. 8.3.3.5/8.3.3.6.

After performing an associating procedure between the AP and the non-AP STA, transmission and reception of normal data may be performed between the AP and the non-AP STA. When the associating procedure between the AP and the non-AP STA fails, the associating procedure between the AP and the non-AP STA is again performed based on the failed cause of the coupling or the non-AP STA may associate with another AP.

When the STA associates with the AP, the AP may allocate an association identifier (AID) to the STA. The AID allocated to the STA may be a unique value in one BSS. A current AID may be one of 1 to 2007. 14 bits are allocated for the AID so that the AID of maximum 16383 may be used but a value of 2008 to 16383 is reserved.

In an IEEE 802.11 standard, in order to increase a life of the STA of the WLAN, a power saving mechanism is provided.

For the purpose of saving the power, the STA may operate based on two states including an awake state and a doze state. The STA may operation in a power save mode based on the awake state and the doze state.

The STA in the awake state may perform a normal operation such as transmission or reception of the frame and channel scanning Meanwhile, the STA in the doze state does not perform transmission or reception of the frame and channel scanning in order to reduce power consumption. The STA operating in the power save mode maintains the doze state in order to reduce the power consumption. If necessary, the STA may be switched or transition to the awake state to communicate with the AP.

If the maintenance time in the doze state of the STA is increased, the power consumption of the STA may be reduced and the life of the STA may be also increased. However, transmission or reception of the frame of the STA is impossible in the doze state. When there is the uplink frame pending in the STA, the STA may be changed to an active state from the doze state to transmit the uplink frame to the AP. Conversely, when there is a pending frame to be transmitted to the STA in the doze state in the AP, the AP cannot transmit the pending frame to the STA to switching to the awake mode of the STA.

Accordingly, the STA may be sometimes changed to the awake state from the doze state and receive information on whether there is a pending frame with respect to the STA from the AP. The AP may transmit information on presence of the pending downlink data with respect to the STA by taking into consideration a switch time to the awake state of the STA.

In detail, in order to receive the information on the presence of the pending frame with respect to the STA, the STA may be periodically switched to the awake state from the doze state to receive a beacon frame. The beacon frame is a frame used for passive scanning and may include information on capability of the AP. The AP may periodically (e.g., 100 msec) transmit a beacon frame to the STA.

Figure 4:
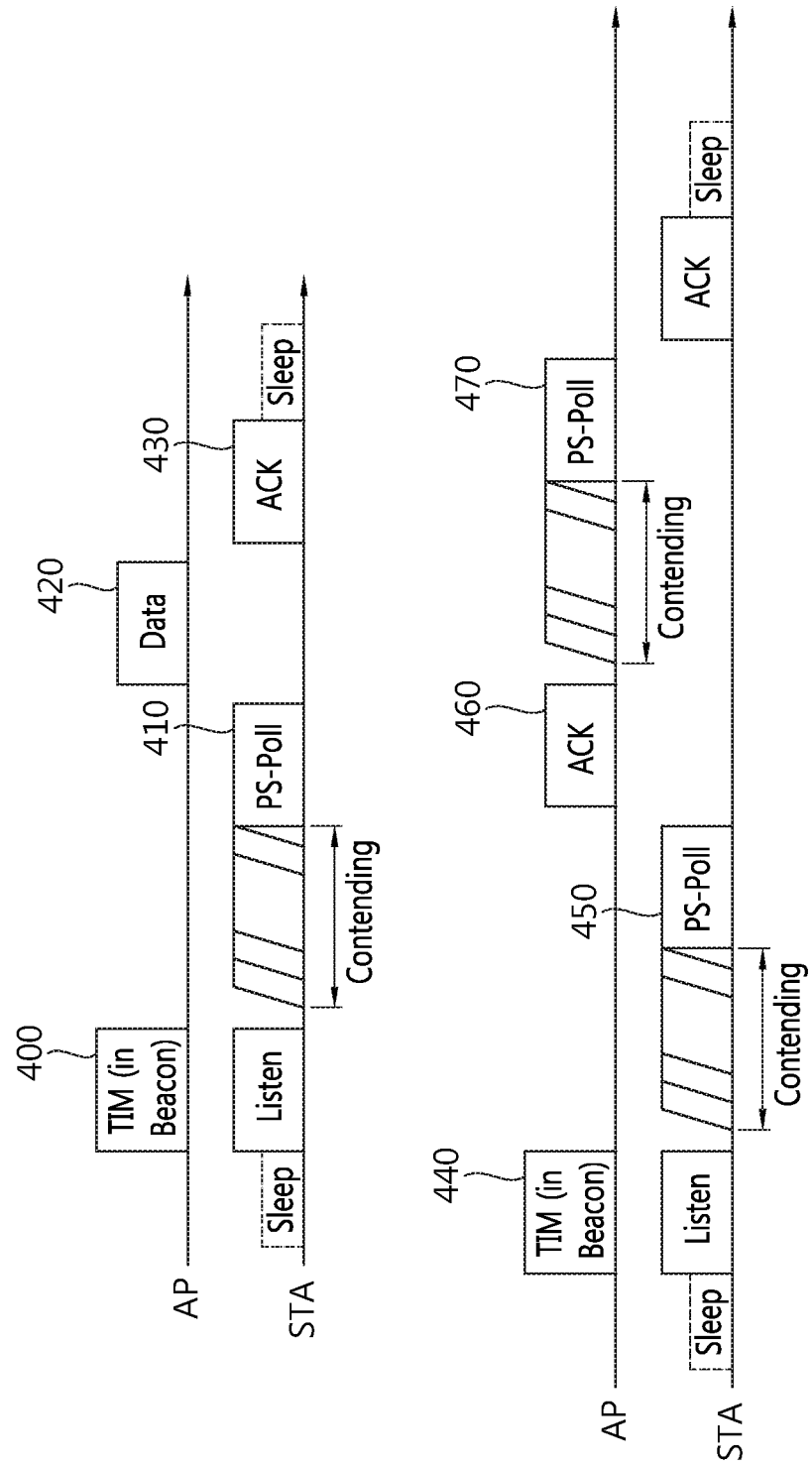
FIG. 4 is concept diagram illustrating a power saving method based on a beacon frame.

FIG. 4 is concept diagram illustrating a power saving method based on a beacon frame.

Referring to FIG. 4, the AP may transmit the beacon frame. The STA may be periodically changed to the awake state from the doze state by taking into consideration transmission timing of the beacon frame.

The beacon frame may include a traffic indication map (TIM) element. The TIM element may be used to transmit information on the downlink data with respect to the pending STA to the AP. For example, the TIM element may transmit information on the pending frame to the STA based on a bitmap.

The TIM element may be divided into a TIM or a delivery TIM (DTIM). The TIM may indicate presence of the pending downlink data to be transmitted based on unicast to the STA. The DTIM may indicate presence of the pending downlink data to be transmitted based on broadcast/multi-cast.

A upper part of FIG. 4 discloses a method of transmitting a downlink frame based on immediate response with respect to a power saving (PS)-poll frame.

Referring to the upper part of FIG. 4, the STA may receive information on the presence of the pending downlink data with respect to the STA from the AP based in the TIM of the beacon frame 400. The STA may transmit the PS-poll frame 410 to the AP. The AP may receive the PS-poll frame 410 from the STA and may transmit the downlink frame 420 to the STA as immediate response. The immediate response to the PS-poll frame of the AP may be performed after reception of the PS-poll frame and short inter-frame space (SIFS).

The STA may transmit an ACK frame 430 as response to the downlink frame. When transmission of the pending downlink data with respect to the STA of the AP is terminated, the STA may be again switched or transition to the doze state.

A down part of FIG. 4 discloses a method of transmitting a downlink frame of the AP based on a deferred response with respect to the PS-poll.

Referring to the down part of FIG. 4, the STA may receive the information on the presence of the pending downlink data with respect to the STA from the AP based on the TIM of the beacon frame 440. The STA may transmit the PS-poll frame 450 the AP. The AP may receive the PS-poll frame 450 from the STA, and may transmit the ACK frame 460 to the STA as response to the PS-poll frame 450. The AP may transmit the downlink frame 470 including the pending downlink data after transmission of the ACK frame 460 to the STA. The STA may monitor the downlink frame 470 to be transmitted to the STA by the AP after receiving the ACK frame 460.

In the same manner, when the transmission of the pending downlink data with respect to the STA of the AP is terminated, the STA may be again switched or transition to the doze stat from the awake state.

Figure 5:
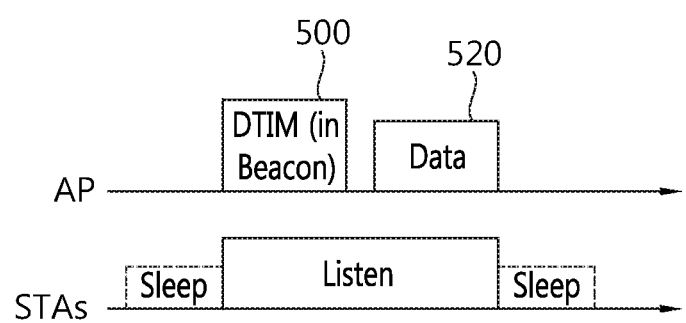
FIG. 5 is a concept diagram illustrating a power saving method based on the beacon frame.

FIG. 5 is a concept diagram illustrating a power saving method based on the beacon frame.

FIG. 5 illustrates a case where the DTIM is transmitted through the beacon frame 500. The beacon frame 500 may include a DTIM. As described above, the DTIM may indicate presence of the pending downlink data to be transmitted based on the broadcast/multi-cast.

Referring to FIG. 5, the AP may transmit the beacon frame 500 including the DTIM to the STA. The STA may maintain the awake state without transmission of the PS-poll frame to monitor the transmission of the downlink frame 520 after reception of the beacon frame 500 including the DTIM. The AP may transmit the downlink frame 520 to the STA through the multi-cast method or the broadcast method.

Hereinafter, in the embodiment of the present invention, the data (frame) transmitted to the STS from the AP may be expressed as downlink data (or downlink frame), and data (or frame) transmitted to the AP from the STA may be expressed as uplink data (or uplink frame). In addition, transmission from the AP to the STA may be expressed as downlink transmission, and transmission from the STA to the AP may be expressed as uplink transmission.

Further, a PHY protocol data unit (PPDU), a frame and data transmitted through the downlink transmission may be expressed by a downlink PPDU, a downlink frame, and downlink data, respectively. The PPDU may be a data unit including a PPDU header, a physical layer service data unit (PSDU) (or MAC protocol data unit (MPDU)). The PPDU header may include a PHY header and a PHY preamble. The PSDU (or MPDU) may be a data unit including a frame (or information unit of a MAC layer) or indicating the frame. The PHY header may be as a physical layer convergence protocol (PLCP) header as another term, and a PHY preamble may be expressed as a PLCP preamble.

Further, a PPDU, a frame, and data transmitted through the uplink transmission may be expressed as an uplink PPDU, an uplink frame, and uplink data.

An existing WLAN system uses the entire bandwidth for uplink transmission to one STA and uplink transmission of one STA based on single (SU)-orthogonal frequency division multiplexing (OFDM). Moreover, in the existing WLAN system, the AP may perform downlink (DL) multi-user (MU) based on multiple input multiple output (MU MIMO), and the transmission may be expressed as MIMO transmission.

According to the WLAN system according to an embodiment of the present invention, a transmission method based on orthogonal frequency division multiple access (OFDMA) may be supported for the uplink transmission and the downlink transmission. In detail, in accordance with the WLAN system according to an embodiment of the present invention, the AP may perform DL MU transmission based on OFDMA. The above transmission may be expressed as DL MU OFDMA transmission. When DL MU OFDMA transmission is performed, the AP may transmit downlink data (or downlink frame, downlink PPDU) to a plurality of STAs through a plurality of frequency resources (a plurality of sub-bands (or sub-channel)) on an overlapped time resource. The DL MU OFDMA transmission may be used together with DL MU MIMO transmission. For example, DL MU-MIMO transmission may be performed based on a plurality of space-time streams) (or spatial stream) on a specific sub-band (or sub-channel) allocated for the DL MU OFDMA transmission.

Further, in the WLAN system according to an embodiment of the present invention, transmission of data one the same time resource to the AP from a plurality of STAs may support uplink multi-user (UL MU) transmission. Uplink transmission in the time resource overlapped by a plurality of STAs may be performed in a frequency domain or a spatial domain.

Uplink transmission by a plurality of STAs is performed on a frequency domain, different frequency resources (sub-band, with respect to a plurality of STAs may be allocated as an uplink transmission resource. A plurality of STAs may transmit uplink data to the AP through different frequency resources which are allocated. The transmission method through the different frequency resources may be expressed as UL MU OFDMA transmission method.

When the uplink transmission by the plurality of STAs is performed on a spatial domain, different space-time streams (or spatial streams) are allocated to a plurality of STAs, and a plurality of STA may transmit uplink data to the AP through different space-time streams. The transmission method through the different spatial streams may be expressed as an UL MU MIMO transmission method.

UL MU OFDMA transmission and UL MU MIMO transmission may be simultaneously performed. For example, UL MU MIMO transmission may be performed based on a plurality of space-time streams (or spatial steams) on a specific sub-band (sub-channel) allocated for UL MU OFDMA transmission.

Hereinafter, an embodiment of the present invention discloses a trigger method of a plurality of PS-poll frames based on MU-MIMO or OFDMA technology.

Figure 6:
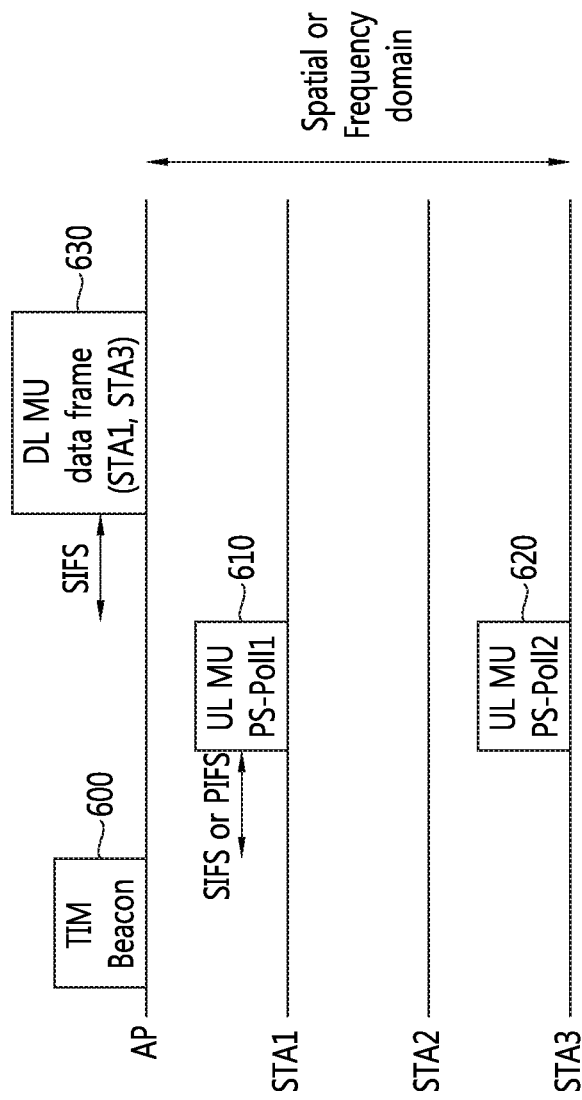
FIG. 6 is a concept diagram illustrating a method of triggering UL MU transmission of a plurality of PS-poll frames according to an embodiment of the present invention.

FIG. 6 is a concept diagram illustrating a method of triggering UL MU transmission of a plurality of PS-poll frames according to an embodiment of the present invention.

FIG. 6 discloses a plurality of PS-poll frames which are triggered based on a beacon frame and transmitted based on UL MU transmission.

Referring to FIG. 6, the AP may transmit a beacon frame 600. The beacon frame 600 transmitted from the AP may include a TIM element including information on pending downlink data with respect to a plurality of STAs and information for triggering PS-poll frames 610 and 620 to be transmitted based on UL MU transmission by a plurality of STAs. Hereinafter, the information for triggering PS-poll frames 610 and 620 to be transmitted based on UL MU transmission by a plurality of STAs may be expressed as PS poll trigger information.

The PS-poll trigger information may include partial AID information, UL MU resource information, bandwidth information, start time information, reception trigger frame information, and the like. The start time information may be expressed as start offset information, or transmission time offset. Hereinafter, in the embodiment of the present invention, the term 'transmission time offset information' is used.

Partial AID information may include identification of a plurality of STA to be transmitted.

The UL MU resource information may include information on an uplink resource allocated to a plurality of STAs for transmission of PS-poll frames 610 and 620. In detail, when a plurality of PS-poll frames 610 and 620 are transmitted based on UL MU OFDMA transmission, UL MU resource information may include information on a channel and/or a sub-channel (sub-band) for transmission of a plurality of PS-poll frames 610 and 620. When a plurality of PS-poll frames 610 and 620 are transmitted based on UL MU MIMO transmission, UL MU resource information may include space-time stream (or spatial stream) for transmission of a plurality of PS-poll frames 610 and 620. The information on the space-time stream for transmitting the plurality of PS-poll frames 610 and 620 may include information on the number of space-time streams allocated to a plurality of STAs.

Further, the UL MU resource information may include modulation and coding scheme (MCS) information for transmitting the downlink data.

The bandwidth information may include information on the whole bandwidth allocated for transmitting the PS-poll frames 610 and 620.

The transmission time offset information may include information on a transmission time point of a PS-poll trigger frame. In FIG. 6, the beacon frame 600 triggers UL MU transmission of PS-poll frames 610 and 620. In an embodiment to be described later, the PS-poll trigger frame may trigger UL MU transmission of PS-poll frames 610 and 620. The transmission time offset information may include information on a transmission time point of a PS-poll trigger frame. The PS-poll trigger frame is a frame for triggering the PS-poll frame 610 and may be expressed as a PS-poll request frame (or trigger frame). The number of STAs receiving pending downlink data in the AP may be greater than the number of PS-poll frames which may be received based on one UL MU transmission (or the number of STAs which may communicate based on UL MU transmission/DL MU transmission). In this case, a plurality of PS-poll trigger frames are transmitted during a beacon interval, and a plurality of PS-poll trigger frames may trigger UL MU transmission of a plurality of PS-poll frames 610 and 620 a plurality of times.

The transmission time offset information may include information on a transmission time point of a PS-poll trigger frame to be transmitted after the beacon frame 600. As another expression, the transmission time offset information may include information on transmission time offset indicting an inter-frame space between the beacon frame 600 and the PS-poll trigger frame. The transmission time offset information may include information on a transmission time point of a plurality of PS-poll trigger frames to be transmitted within the beacon interval.

When the plurality of PS-poll trigger frames are transmitted within the beacon interval, reception trigger frame information may include information on a PS-poll trigger frame among a plurality of PS-poll trigger frames which a plurality of STA will receive. For example, the reception trigger frame information may include information on reception of which PS-poll trigger frame is transmitted after transmission of the beacon frame 600. In detail, the reception trigger frame information may include a trigger frame indication bit map to be described later.

If the plurality of STAs receives the beacon frame 600, the STAs may transmit a plurality of PS-poll frames 610 and 620 using UL MU transmission based on a fixed inter-frame space (e.g., short inter-frame space (SIFS), and a point coordination function (PCF) inter-frame space (PIFS).

In detail, presence of the pending downlink data is indicated based on a TIM element of the beacon frame 600. A plurality of STAs in which transmission of PS-poll frames 610 and 620 based on PS-poll trigger information included in the beacon frame 600 may transmit a plurality of PS-poll frames 610 and 620 using UL MU transmission based on the fixed inter-frame space.

The AP may transmit a plurality of downlink data frames 630 using DL MU transmission as a response to a plurality of PS-poll frames 610 and 620 to a plurality of STAs, respectively.

As shown in FIG. 6, presence of the pending downlink data is indicated based on a TIM element of the beacon frame 600. The STA1 and the STA3 in which transmission of the PS-poll frames 610 and 620 is triggered based on PS-poll trigger information included in the beacon frame 600 may transmit a first PS-poll frame 610 and a second PS-poll frame 620 to the AP using UL MU transmission based on fixed inter-frame space.

The AP may transmit a first downlink data frame and a second downlink data frame as a response to the first PS-poll frame 610 and a second PS-poll frame 620 transmitted by the STA1 and the STA2 using DL MU transmission.

Figure 7:
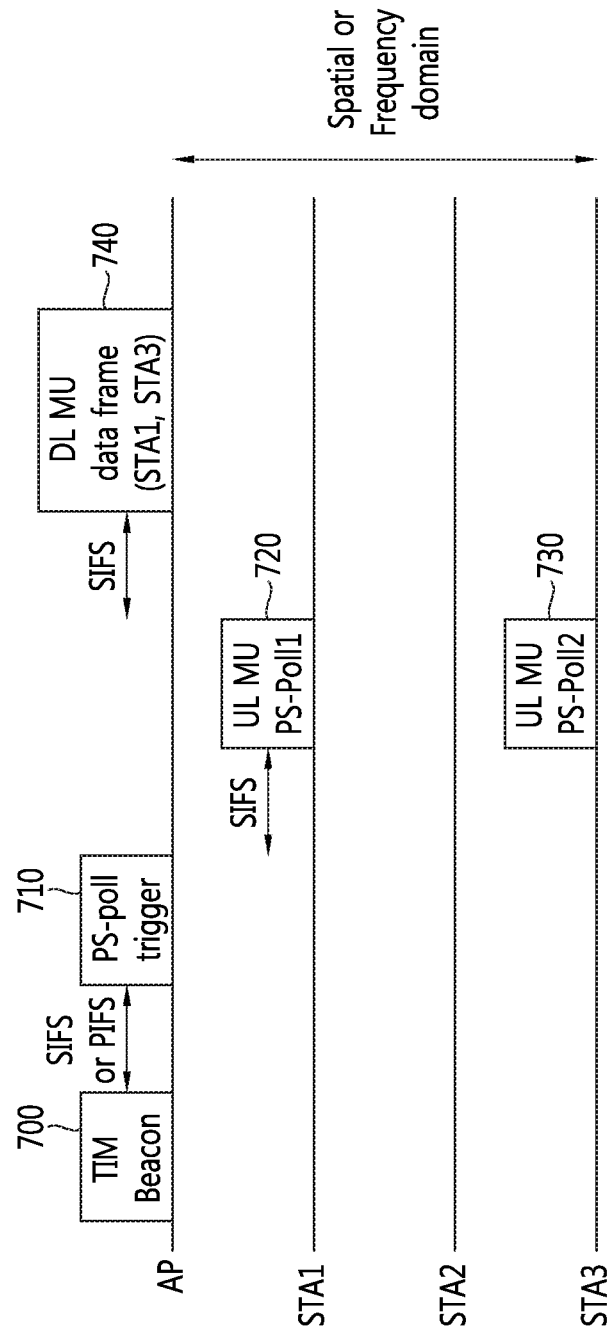
FIG. 7 is a concept diagram illustrating a method of triggering UL MU transmission of a plurality of PS-poll frames according to an embodiment of the present invention.

FIG. 7 is a concept diagram illustrating a method of triggering UL MU transmission of a plurality of PS-poll frames according to an embodiment of the present invention.

FIG. 7 discloses a plurality of PS-poll frames which are triggered according to a PS-poll trigger frame transmitted after a beacon frame and are transmitted based on UL MU transmission. That is, in FIG. 7, a plurality of PS-poll frames is not triggered according to the beacon frame unlike FIG. 6 but is triggered according to a PS-poll trigger frame.

Referring to FIG. 7, the AP may transmit the beacon frame 700. The beacon frame 700 transmitted according to the AP may include a TIM element including information on pending downlink data with respect to a plurality of STAs.

The AP may transmit a PS-poll trigger frame 710 after transmission of the beacon frame 700 based on the fixed inter-frame space (e.g., SIFS or PIFS).

The PS-poll trigger frame 710 may include partial AID information and UL MU resource information. The partial AID information may include identifier of a plurality of STAs for transmitting a PS-poll frame based on UL MU transmission. The UL MU resource information may include resource allocation information for a plurality of PS-poll frames 720 and 730 to be transmitted by a plurality of STAs.

A plurality of STAs indicated based on the PS-poll trigger frame 710 may transmit a plurality of PS-poll frames 720 and 730 based on UL MU transmission. A plurality of STAs may receive the trigger frame 710 and may transmit a plurality of PS-poll frames 720 and 730 to the allocated UL MU resources, respectively based on the fixed inter-frame space (e.g., SIFS).

If the AP receives the PS-poll frames 720 and 730 from the plurality of STAs, the AP may transmit a plurality of downlink data frames 740 with respect to a plurality of STAs, respectively. The AP may receive PS-poll frames 720 and 730, and transmit a plurality of downlink data frames 740 based on PS-poll frames 720 and 730 and the fixed inter-frame space (e.g., SIFS).

Referring to FIG. 7, the STA1및 STA2 may transit PS-poll frames 720 and 730 based on UL MU transmission. Each of the STA1 and the STA2 may receive the PS-poll trigger frame 710 and may transmit the first PS-poll frame 720 and the second PS-poll frame 730 based on the fixed inter-frame space (e.g., SIF).

If the AP receives the first PS-poll frame 720 and the second PS-poll frame 730 from the STA1 and the STA2, the AP may transmit a first downlink data frame and the second downlink data frame with respect to the STA1 and the STA2 based on DL MU transmission. The AP may receive the first PS-poll frame 720 and the second PS-poll frame 730 and may transmit the first downlink data frame and the second downlink data frame based on the fixed inter-frame space (e.g., SIFS).

Figure 8:
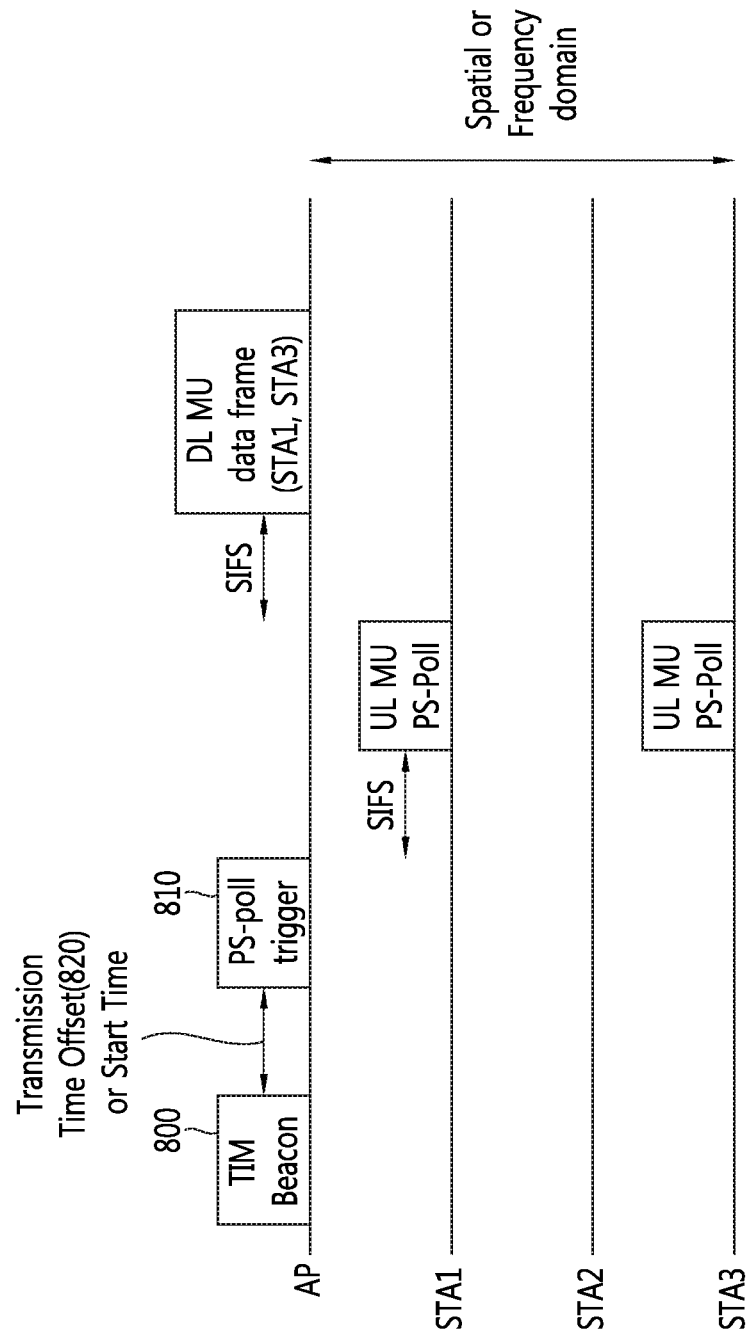
FIG. 8 is a concept diagram illustrating a method of triggering UL MU transmission of a plurality of PS-poll frames according to an embodiment of the present invention.

FIG. 8 is a concept diagram illustrating a method of triggering UL MU transmission of a plurality of PS-poll frames according to an embodiment of the present invention.

FIG. 8 discloses a plurality of PS-poll frames which are triggered by the PS-poll trigger frame (or PS-poll request frame) 810 transmitted after the beacon frame 800 and are transmitted based on the UL MU.

Unlike FIG. 7, the transmission time point of the PS-poll trigger frame 810 based on the beacon frame 800 may be determined according to transmission time offset information included in the beacon frame 800.

As described above, the beacon frame 800 may include transmission time offset information. The transmission offset information may include one information at a transmission time point of the PS-poll trigger frame 810 after the transmission of the beacon frame 800. That is, the AP may determine the transmission time point of the PS-poll trigger frame 810 to be transmitted after the beacon frame 800, and may report the information on the transmission time point of a preset PS-poll trigger frame 810 through transmission time offset information of the beacon frame 800.

The STA receiving the beacon frame 800 may determine the transmission time point of the PS-poll trigger frame 810 based on the transmission time offset information included in the beacon frame 800.

At least one STA in which presence of the pending downlink data among a plurality of STAs receiving the beacon frame 800 is indicted based on a TIM element of the beacon frame 800 may monitor the PS-poll trigger frame 810 at a transmission time point of the PS-poll trigger frame 810 to receive the PS-poll trigger frame 810.

When the transmission time point of the PS-poll trigger frame 810 is set based on transmission time offset information, the STA receiving indication of presence of the pending downlink data based on the TIM element of the beacon frame 800 may receive the beacon frame 800, and may then maintain a doze state before transmission of the PS-poll trigger frame 810, and may receive the PS-poll trigger frame 810 transmitted by the AP where the doze state is switched to the awake state at the transmission time point of the PS-poll trigger frame 810.

Figure 9:
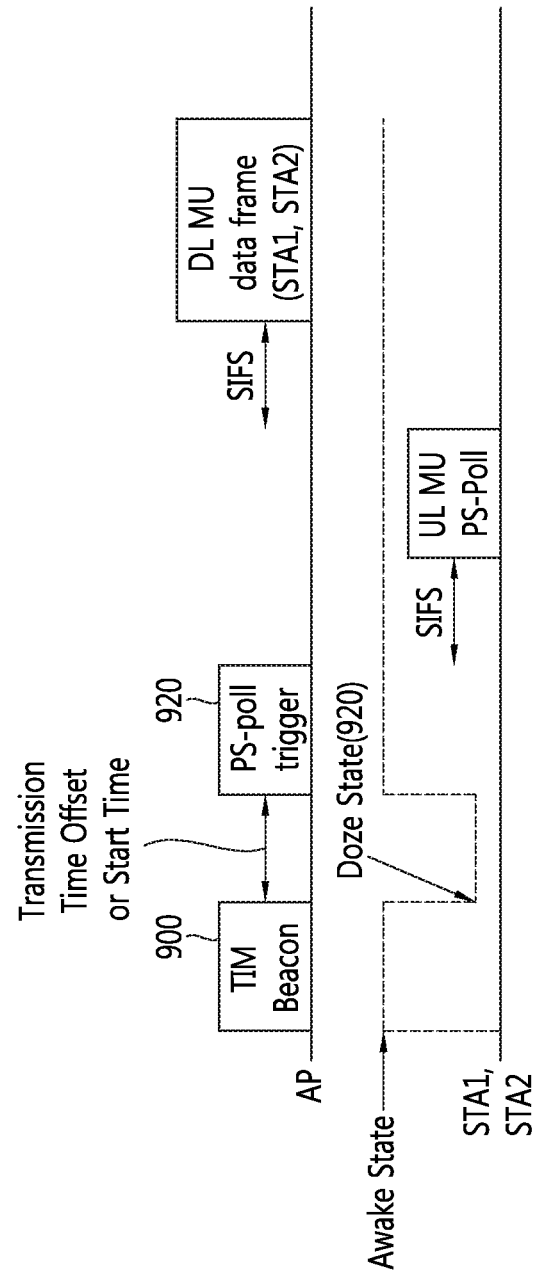
FIG. 9 is a concept diagram illustrating a power save mode operation of the STA according to an embodiment of the present invention.

FIG. 9 is a concept diagram illustrating a power save mode operation of the STA according to an embodiment of the present invention.

Referring to FIG. 9, as illustrated in FIG. 8, the STA1 and the STA2 may receive the beacon frame 900. When a transmission time point of the PS-poll trigger frame 940 is set based on the transmission time offset information included in the beacon frame 900, the STA1 and the STA2 in which presence of the pending downlink data is indicated based on a TIM element of the beacon frame 900 may receive the beacon frame 900, and may then maintain the doze state before transmission of the PS-poll trigger frame 920. Next, the STA1 and the STA2 may be switched to the awake state from the doze state at a transmission time point of the PS-poll trigger frame 920 to receive the PS-poll trigger frame 920.

Figure 10:
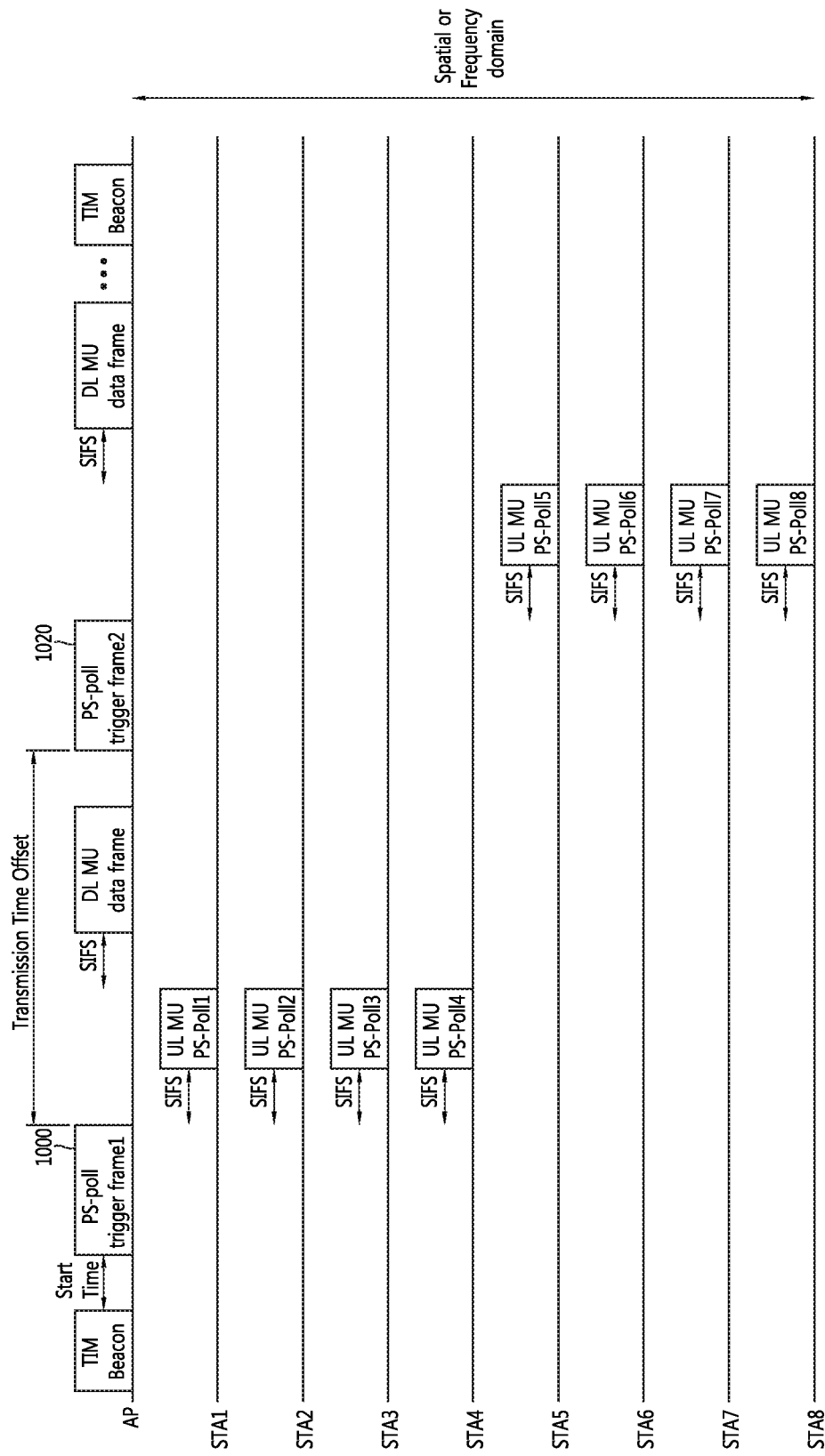
FIG. 10 is a concept diagram illustrating a method of triggering UL MU transmission of a plurality of PS-poll frames according to an embodiment of the present invention.

FIG. 10 is a concept diagram illustrating a method of triggering UL MU transmission of a plurality of PS-poll frames according to an embodiment of the present invention.

FIG. 10 discloses a plurality of PS-poll frames which are triggered according to a plurality of PS-poll trigger frames transmitted after the beacon frame and are transmitted based on the UL MU transmission.

The number of positive traffic indications included in a virtual bitmap or a virtual traffic indication bitmap of a TIM element of the beacon frame transmitted from the AP may exceed the number of STAs transmitting a PS-poll frame based on one PS-poll trigger frame. In this case, triggering based on one PS-poll trigger frame may not transmit downlink data to a plurality of STAs which receive indication of presence of the downlink data based on the virtual traffic indication bit map.

According to the embodiment of the present invention, the AP may transmit a plurality of PS-poll trigger frames within a beacon interval to receive the PS-poll frame from a plurality of STAs receiving indication of the pending downlink data based on the virtual bit map of the TIM element and to transmit downlink data as a response to the PS-poll frame.

In this case, a plurality of bits included in the virtual traffic indication bit map may indicate whether the pending down link data are present to the STA corresponding to a specific AID, respectively. When a value of a bit is a positive traffic indication, presence of the pending downlink data to the STA corresponding to a specific AID corresponding to the bit. Further, the beacon interval may indicate a transmission interval between beacon frames transmitted by one AP as a target beacon transmission time (TBTT).

Referring to FIG. 10, the beacon frame is transmitted, and the TIM element of the beacon frame may indicate the pending downlink data with respect to the STA1 to the STA8, respectively. In detail, the virtual bit map included in the TIM element may indicate the downlink data where bits corresponding to the STA1 to the STA8 are configured as a positive traffic indication and are pending in the STA1 to the STA8, respectively.

The beacon frame may include transmission time offset information. The transmission time offset information may include information on the transmission time point of the first PS-poll trigger frame 1000.

Further, the beacon frame may include information on the PS-poll trigger frame which the STA1 to the STA8 will receive. For example, the beacon frame may include reception trigger frame information. The reception trigger frame information may explicitly or implicitly indicate a plurality of STAs (e.g., STA1 to STA4) receiving the first PS-poll trigger frame 1000 and a plurality of STAs (STA5 to STA8) receiving the second PS-poll trigger frame 1020.

The AP may transmit the first PS-poll trigger frame 1000 at a transmission time point of the first PS-poll trigger frame 1000 configured by the beacon frame. The first PS-poll trigger frame 1000 may trigger transmission of the first PS-poll frame to the fourth PS-poll frame by the STA1 to the STA4, respectively.

The STA1 to the STA4 may receive the first PS-poll trigger frame 1000 based on reception trigger frame information of the beacon frame, and may transmit the first PS-poll frame to the fourth PS-poll frame through an allocated UL transmission resource based on UL MU transmission. The information on the UL MU transmission resource for transmitting the first PS-poll frame to the fourth PS-poll frame may be included in the beacon frame or the first PS-poll trigger frame.

If the AP receives the first PS-poll frame to the fourth PS-poll frame, the AP may transmit the first downlink data frame to the fourth downlink data frame including downlink data pending in the STA1 to the STA4 to the STA1 to the STA4 based on the DL MU transmission.

The PS-poll trigger frame may include information on a transmission time of a next PS-poll trigger frame to be transmitted within the beacon interval. For example, the first PS-poll trigger frame 1000 may include transmission time offset information. The transmission time offset information included in the PS-poll trigger frame 1000 may include information on a transmission time point of the second PS-poll trigger frame 1020 to be transmitted after the first PS-poll trigger frame 1000.

If the STA5 to the STA8 receive the first PS-poll trigger frame 1000, the STA5 to the STA8 may acquire information on the transmission time point of the second PS-poll trigger frame 1020 based on the transmission time offset information included in the first PS-poll trigger frame 1000.

The STA5 to the STA8 may receive the second PS-poll trigger frame 1020 by taking into consideration the transmission time point of the second PS-poll trigger frame 1020, and may transmit the fifth PS-poll frame to the eighth PS-poll frame through the allocated UL transmission resource based on the UL MU transmission. The information on the UL MU transmission resource for transmitting the fifth PS-poll frame to the eighth PS-poll frame may be included in the beacon frame or the second PS-poll trigger frame 1020.

If the AP receives the fifth PS-poll frame to the eighth PS-poll frame, the AP may transmit a fifth downlink data frame to the eighth downlink data frame including the downlink data pending in the STA5 to the STA8 to the STA5 to the STA8 based on the DL MU transmission, respectively.

It is assumed in FIG. 10 that the beacon frame includes information on a PS-poll trigger frame which a plurality of STAs receiving indication of presence of the pending downlink data based on the TIM element. However, the beacon frame may not include information on the PS-poll trigger frame which a plurality of STAs receiving indication of presence of the pending downlink data based on the TIM element will receive. In this case, at least one STA receiving a plurality of trigger frames may directly indicated in a plurality of PS-poll trigger frames, respectively.

Figure 11:
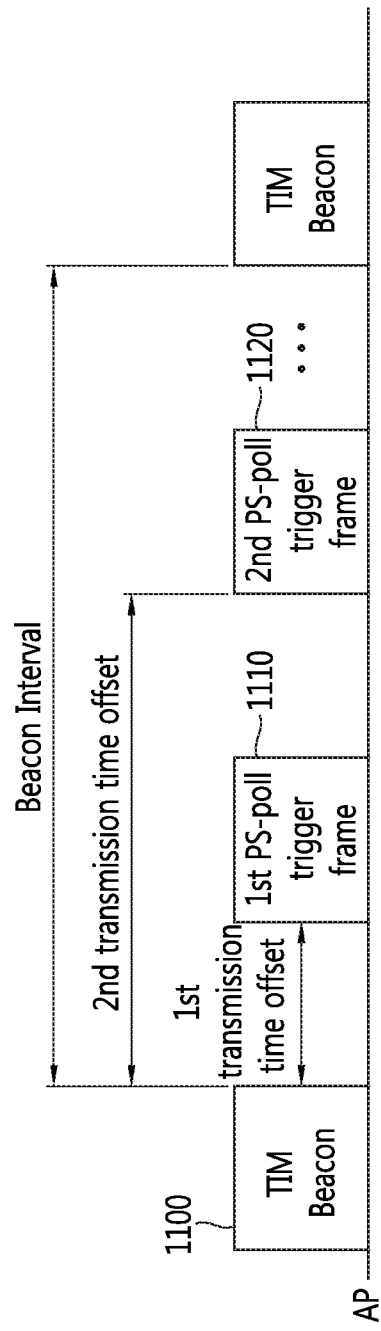
FIG. 11 is a concept diagram illustrating a method of triggering UL MU transmission of a plurality of PS-poll frames according to an embodiment of the present invention.

FIG. 11 is a concept diagram illustrating a method of triggering UL MU transmission of a plurality of PS-poll frames according to an embodiment of the present invention.

FIG. 11 discloses a method of indicting a plurality of transmitting time points of a plurality of PS-poll trigger frames transmitted between beacon intervals based on the beacon frame.

Referring to FIG. 11, when N PS-poll trigger frames are transmitted between the beacon interval, information on transmission time points (start times) of the N PS-poll trigger frames may be included in the beacon frame.

In this case, the AP may transmit N PS-poll trigger frames at N transmission time points by dividing the beacon interval into N (or N+1) time periods and setting N transmission time points for transmitting the N PS-poll trigger frames.

The beacon frame 1100 may include information on the N transmission time points. The information on the N transmission time points may include information on the PS-poll trigger frame to be read by STAs having an AID corresponding to a bit configured by a positive traffic indication in the TIM element. Information on the N transmission time points may indicate a PS-poll trigger frame to be implicitly read by STAs.

Alternatively, the beacon frame 1100 may include information on the PS-poll trigger frame to be read by STAs having an AID corresponding to a bit configured by the positive traffic indication in the TIM element as information separately from the information on the N transmission time points.

For example, the beacon frame 1100 may include information on first transmission time offset (or first start offset) (a transmission time of the first PS-poll trigger frame 1110), second transmission time offset (or second start offset) (a transmission time of the second PS-poll trigger frame 1120), third transmission time offset (or third start offset) (a transmission time of the third PS-poll trigger frame), ... , N-th transmission time offset (or N-th start offset) (a transmission time of the N-th PS-poll trigger frame). Each transmission time may have different values as a time set based on the beacon frame 1100.

For example, as illustrated in a following table 1, information indicating N STAs receiving a PS-poll trigger frame and information on start times of a plurality of PS-poll trigger frames may be transmitted through the beacon frame.

TABLE 1

Number of STA (N) (number of STAs (N))
For(1:N){
    AID
    Start time (e.g., start offset, that is, transmittion order of PS-poll trigger frame) (for example, a first PS-poll trigger frame, a second PS-poll trigger frame, ..., a N-th PS-poll trigger frame)
}
Number of STA (N) (number of STAs (N))
  For(1:N){
    AID
    Transmission time (for example, transmission time offset), that is, transmittion order of PS-poll trigger frame) (for example, a first PS-poll trigger frame, a second PS-poll trigger frame, ..., a N-th PS-poll trigger frame)
}

As described above, the start time has the same meaning as the transmission time, and the start offset may be interpreted as the same meaning as the transmission time offset.

Figure 12:
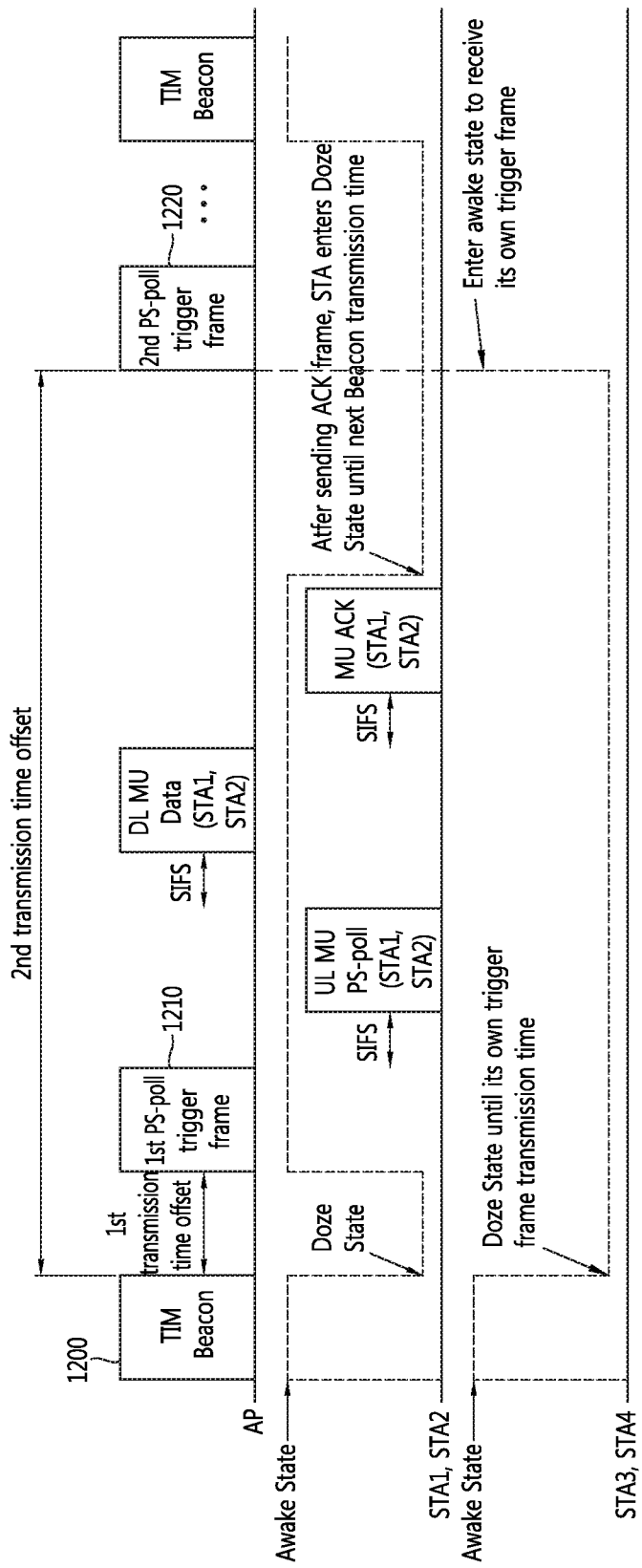
FIG. 12 is a concept diagram illustrating a power save mode operation of an STA according to an embodiment of the present invention.

FIG. 12 is a concept diagram illustrating a power save mode operation of an STA according to an embodiment of the present invention.

FIG. 12 discloses a method for being switched to a doze state based on a transmission time (or transmission time offset) of a PS-poll trigger frame by a plurality of STAs which receives indication of the pending downlink data based on the beacon frame.

Referring to FIG. 12, the AP may transmit information on the transmission time of the first PS-poll trigger frame 1210 which the STA1 and the STA2 will receive through the beacon frame 1200 to the STA1 and the STA2. Further, the AP may transmit information on the transmission time of the second PS-poll trigger frame 1220 which the STA3 and the STA4 will receive through the beacon frame 1200 to the STA3 and the STA4.

The STA1 and the STA2 may receive the beacon frame and may be switched to a doze state from an active state before reception of the first PS-poll trigger frame 1210 by taking into consideration the transmission time of the first PS-poll trigger frame 1210. The STA3 and the STA3 may receive the beacon frame and may be switched to a doze state from an active state before reception of the second PS-poll trigger frame 1220 by taking into consideration the transmission time of the second PS-poll trigger frame 1220.

The STA1 and the STA2 may be again switched to the awake state for receiving the first PS-poll trigger frame 1210 by taking into consideration a transmission time of the first PS-poll trigger frame 1210. The STA1 and the STA2 may receive the first trigger frame 1210, and may transmit the first PS-poll frame 1210 and the second PS-poll frame 1220 based on UL MU transmission.

The AP may transmit a first downlink data frame including the first downlink data with respect to the STA1 and a second downlink data frame including the second downlink data with respect to the STA2 as a response to the first PS-poll frame 1210 and the second PS-poll frame 1220. The STA1 and the STA2 may receive the first downlink data frame and the second downlink data frame, and may transmit a block acknowledgement (ACK) frame (or ACK frame) to the AP based on the UL MU transmission as a response to the first downlink data frame and the second downlink data frame. Next, the STA1 and the STA2 may be switched to the doze state from the awake state before transmission of a next beacon frame.

In the same manner, the STA3 and the STA4 may be again switched to the awake state for receiving the second trigger frame 1220 by taking into consideration the transmission time of the second PS-poll trigger frame 1220. The STA3 and the STA4 may receive the second PS-poll trigger frame 1220, and may transmit the third PS-poll frame and the fourth PS-poll frame based on the UL MU transmission.

The AP may transmit a third downlink data frame including a third downlink data with respect to the STA3 and a fourth downlink data frame including the fourth downlink data with respect to the STA4 as a response to the third PS-poll frame and the fourth PS-poll frame, respectively. The STA3 and the STA4 may receive the third downlink data frame and the fourth downlink data frame, and may transmit a block ACK frame (or ACK frame) to the AP based on the UL MU transmission as a response to the third downlink data frame and the fourth downlink data frame. Next, the STA3 and the STA4 may be switched to the doze state from the awake state before transmission of a next beacon frame.

Figure 13:
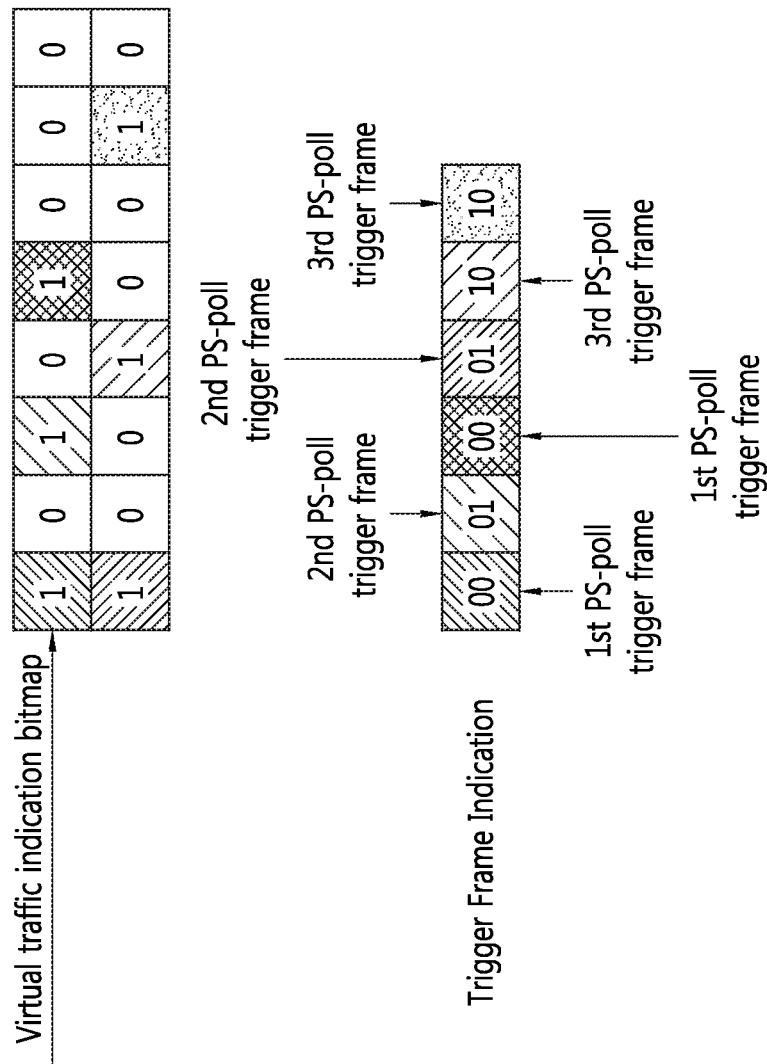
FIG. 13 is a concept diagram illustrating a method of indicating a PS-poll trigger frame to be received by the STA according to an embodiment of the present invention.

FIG. 13 is a concept diagram illustrating a method of indicating a PS-poll trigger frame to be received by the STA according to an embodiment of the present invention.

FIG. 13 discloses a method of indicating a PS-poll trigger frame to be explicitly received by the STA. In detail, the STA may explicitly receive indication of presence of reception of which PS-poll trigger frame is transmitted among a plurality of PS-poll trigger frames to be transmitted between beacon intervals. It is assumed in FIG. 13 that four PS-poll trigger frames are transmitted at the beacon interval.

Referring to FIG. 13, the AP may transmit a virtual traffic indication bitmap (traffic indication bitmap or partial virtual bitmap) of 2 octet length through the beacon frame to the STA.

When a bit included in the virtual traffic indication bitmap has a value of 1, the presence of the pending downlink data with respect to the STA including an AID corresponding to the bit may be indicated.

According to the embodiment of the present invention, in order to indicate the trigger frame to be explicitly received within the beacon interval of each STA corresponding to the virtual traffic indication bitmap, the trigger frame indicator may be defined.

In detail, the trigger frame indicator may be defined in a unit of N bits (where, a N is a natural number) corresponding to a bit (e.g., a bit having a value of 1) set by a positive traffic indication on the virtual traffic indication bitmap. As another expression, in order to indicate a trigger frame to be received by the STA corresponding to a bit (for example, a bit having a value of 1) set by the positive traffic indication at the traffic indication bit map, the trigger frame indicator may be defined in the unit of N bits. N bits for the trigger frame indicator may be determined based on the number of PS-poll trigger frames to be transmitted within the beacon interval. For example, when four PS-poll trigger frames are transmitted within the beacon interval, the N may be 2, and a trigger frame indicator 00 may indicate a firstly transmitted PS-poll trigger frame 1, a trigger frame indicator 01 may indicate a secondly transmitted PS-poll trigger frame 2, a trigger frame indicator 10 may indicate a thirdly transmitted PS-poll trigger frame 3, and a trigger frame indicator 11 may indicate a fourthly transmitted PS-poll trigger frame 4.

As shown in FIG. 13, a value of 6 bits among 16 bits configuring the virtual traffic indication bitmap may be 1. This indicates the pending downlink data with respect to six STAs (STA1 to STA6). The trigger frame indicator may be allocated to the six STAs. A group of trigger frame indicators with respect to a plurality of STAs may be expressed as a trigger frame indicator bitmap.

The trigger frame indicator with respect to the STA1 is 00. This may indicate reception of a first PS-poll trigger frame of the STA1. The trigger frame indicator with respect to the STA2 is 01. This may indicate the reception of a second PS-poll trigger frame of the STA2. The trigger frame indicator with respect to the STA3 is 00. This may indicate reception of a first PS-poll trigger frame of the STA3. The trigger frame indicator with respect to the STA4 is 01. This may indicate reception of a second PS-poll trigger frame of the STA4. The trigger frame indicator with respect to the STA5 is 10. This may indicate reception of a third PS-poll trigger frame of the STA5. The trigger frame indicator with respect to the STA6 is 10. This may indicate reception of a third PS-poll trigger frame of the STA6.

The trigger frame indicator may be sequentially listed in the virtual traffic indication bitmap corresponding to a sequential list of the positive traffic indicator to form the trigger frame indicator bitmap. For example, if the positive traffic indication sequentially indicates the STA1 to the STA6 in the virtual traffic indication bitmap, the trigger frame indicator is sequentially listed in the STA1 to the STA6 to form one trigger frame indicator bitmap.

The number of bits for the trigger frame indicator may be changed according to the maximum number of PS-poll trigger frames transmitted on the beacon interval. If the maximum number of the PS-poll trigger frames transmitted within one beacon interval is N, the number of bits for the trigger frame indicator per STA may be Ceiling($\log_2(N)$). In detail, if the N is 1 to 2, the trigger frame indicator may be 1 bit. If the N is 3 to 4, the trigger frame indicator may be 2 bits. If the N is 5 to 8, the trigger frame indicator may be 3 bits.

If the bit number configured by the positive traffic indication in the virtual traffic indication bitmap is M, the size of the trigger frame indicator bitmap may be M*Ceiling($\log_2(N)$).

When indication of the PS-poll trigger frame base on the trigger frame indication is used, the AP may allocate the fastest transmitted PS-poll trigger frame within the beacon interval by grouping STAs (e.g., four STAs) having a downlink traffic of the highest priority according to a priority of the downlink traffic.

That is, if a transmission priority of the pending downlink data with respect to the STA is relatively high, the AP may indicate reception of the STA with respect to a PS-poll trigger frame which is relatively and rapidly transmitted within the beacon interval.

In the above scheme, STAs of a first group grouped based on a first priority by taking into consideration the transmission priority may receive allocation of reception of the first PS-poll trigger frame, and receive the first PS-poll trigger frame and then transmits the PS-poll frame to receive the downlink data. Next, STAs of a second group grouped based on a second priority may receive allocation of reception of the second PS-poll trigger frame by taking into consideration a transmission priority, and may receive downlink data by receiving the second PS-poll trigger frame and then transmitting the PS-poll frame.

In addition, according to an embodiment of the present invention, when the trigger frame indication bitmap is used, the STA may transmit the PS-poll frame through a competition based channel access (for example, a channel access based on an enhanced distributed channel access (EDCA)) without a trigger according to the PS-poll trigger frame. To this end, the trigger frame indicator may indicate transmission of the PS-poll frame through a channel access based on the EDCA without the trigger according to the PS-poll trigger frame of the STA.

For example, when the trigger frame indicator is 2 bits, the trigger frame indicator 00 may indicate reception of the first PS-poll trigger frame, the trigger frame indicator 01 may indicate reception of the second PS-poll trigger frame, and the trigger frame indicator 10 may indicate reception of the third PS-poll trigger frame. The trigger frame indicator 11 may indicate transmission of the PS-poll frame through a competition based channel access of the STA without the triggering (or no trigger frame).

When all bits configuring the trigger frame indicator with respect to the STA are set to 1, the STA may not perform UL MU based transmission of the PS-poll frame based on the reception of the PS-poll trigger frame and may transmit the PS-poll frame to the AP through the competition based channel access such as the EDCA.

When triggering of the PS-poll frame is impossible based on the PS-poll trigger frame with respect to all STAs set by the positive traffic indication in the virtual traffic indication bitmap (scheduling with transmission of the PS-poll frame based on the UL MU transmission of all STAs set by the positive traffic indication in the virtual traffic indication bitmap is impossible as another expression), the AP may guide transmission of the PS-poll frame using a competition based channel access such as the EDCA of a partial STA.

In the same manner, when the trigger frame indicator is 3 bits and a trigger frame indicator corresponding to the STA is 111, the STA may transmit the PS-poll frame using the competition based channel access such as the EDCA without triggering according to the PS-poll trigger frame.

When the trigger frame indicator is 3 bits, the trigger frame indicator 000 may indicate reception of the first PS-poll trigger frame, the trigger frame indicator 001 may indicate reception of the second PS-poll trigger frame, and the trigger frame indicator 010 may indicate reception of the third PS-poll trigger frame. The trigger frame indicator 111 may indicate transmission of the PS-poll frame through a competition based channel access of the STA without the triggering (or no trigger frame).

For example, a trigger frame indicator of 2 bits or 3 bits is described. However, when the trigger frame indicator having the different bit size is defined, one value (for example, when all bits are set to 1) may indicate transmission of the PS-poll frame using the competition based channel access of the STA.

The above embodiment of the present invention transfers information on the PS-poll trigger frame to be explicitly received by the STA through the virtual traffic indication bitmap. Another embodiment of the present invention may use a method of transferring information on the PS-poll trigger frame to be implicitly received by the STA.

Figure 14:
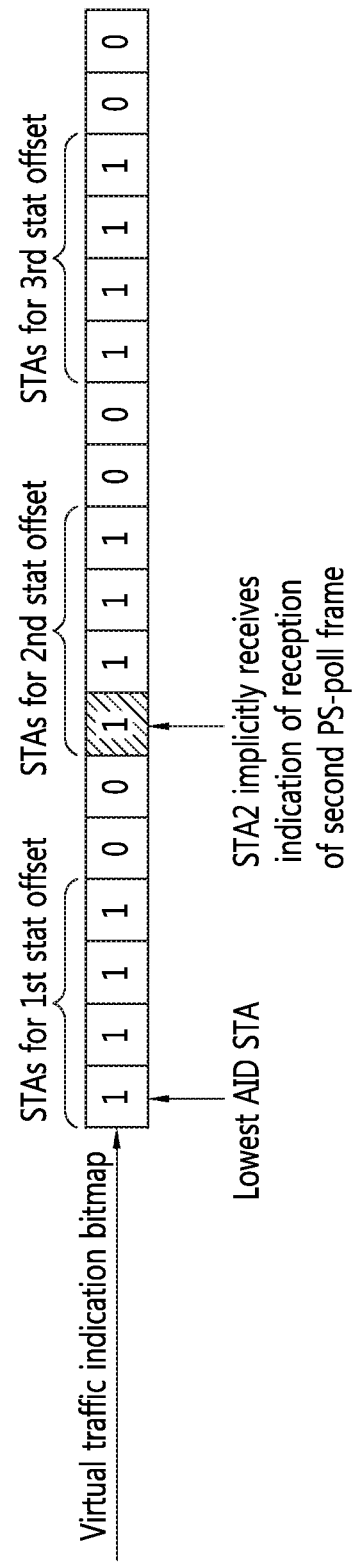
FIG. 14 is a concept diagram illustrating a method of implicitly indicating a PS-poll trigger frame according to an embodiment of the present invention.

FIG. 14 is a concept diagram illustrating a method of implicitly indicating a PS-poll trigger frame according to an embodiment of the present invention.

When the number of STAs to be triggered according to the PS-poll trigger frame is fixed, the PS-poll trigger frame to be received by the STA may be determined based on an order of the positive traffic indication bit included in the virtual traffic indication bitmap of the beacon frame.

When the STA knows which PS-poll trigger frame to be received by the STA is, and transmission time information of the trigger frame, the STA may receive the beacon frame and may be switched to a doze state before transmission of the PS-poll trigger frame to be received.

Referring to FIG. 14, a plurality of bits configuring the virtual traffic indication bitmap may be sequentially listed. An association identifier (AID) allocated to the STA associated with the AP may have a value of 1 to 2007. A plurality of bits configuring the virtual traffic indication bitmap may sequentially indicate the downlink data pending in a plurality of STAs from an STA of an AID1 to an STA of an AID2007.

Bits (for example, bits having a value of 1) set by the positive traffic indication on the virtual traffic indication bitmap may be grouped in a unit of 4 bits to form a positive traffic indication bit group. One positive traffic indication bit group may correspond to one STA group including four STAs which will receive the same PS-poll trigger frame corresponding to the four bits set by the positive traffic indication.

The bits set by a plurality of positive traffic indications included in the virtual traffic indication bitmap may be sequentially grouped in a unit of four bits as a plurality of positive traffic indication bit groups. A plurality of positive traffic indication bit groups may correspond to a plurality of STA groups included in the four STAs. The four STAs included in the plurality of STA groups may receive the same PS-poll trigger frame, and may transmit the PS-poll frame based on UL MU transmission as a response to the same PS-poll trigger frame.

For example, a plurality of STAs (STA1 to STA4) included in the first STA group corresponding to the first positive traffic indication bit group may receive the first PS-poll trigger frame at a first transmission time (or first transmission time offset, first start offset). A plurality of STAs (STA1 to STA4) may transmit the first PS-poll frame to the fourth PS-poll frame based on the UL MU transmission as a response to the first PS-poll trigger frame.

A plurality of STAs (STA5 to STA8) included in the second STA group corresponding to the second positive traffic indication bit group may receive the second PS-poll trigger frame at a second transmission time (or second transmission time offset, second start offset). A plurality of STAs (STA5 to STA8) may transmit the fifth PS-poll frame to the eighth PS-poll frame based on the UL MU transmission as a response to the second PS-poll trigger frame.

A plurality of STAs (STA9 to STA12) included in the third STA group corresponding to the third positive traffic indication bit group may receive the third PS-poll trigger frame at a third transmission time (or third transmission time offset). A plurality of STAs (STA9 to STA12) may transmit the ninth PS-poll frame to the twelfth PS-poll frame based on the UL MU transmission as a response to the third PS-poll trigger frame.

That is, the STA may implicitly know the PS-poll trigger frame to be received based on the virtual traffic indication bitmap without an explicit indication. In detail, the STA may implicitly know the PS-poll trigger frame to be received by the STA based on the number of bits set by the positive traffic indication located before a bit set by the positive traffic indication corresponding to the STA on the virtual traffic indication bitmap.

Figure 15:
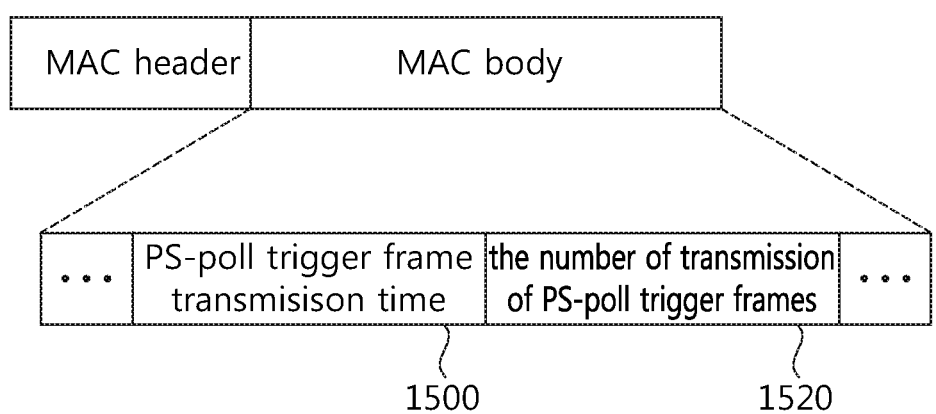
FIG. 15 is a concept diagram illustrating a beacon frame according to an embodiment of the present invention.

FIG. 15 is a concept diagram illustrating a beacon frame according to an embodiment of the present invention.

According to an embodiment of the present invention, transmission of a plurality of PS-poll trigger frames transmitted within the beacon interval may be performed based on the same transmission time. For example, the first PS-poll trigger frame may be transmitted after a transmission time based on transmission of the beacon frame. The second PS-poll trigger frame may be transmitted after the same transmission time based on the transmission of the first PS-poll trigger frame. As another expression, the first PS-poll trigger frame may be transmitted at the inter-frame space corresponding to the transmission time based on the transmission of the beacon frame. In the same manner, the second PS-poll trigger frame may be transmitted at the inter-frame space corresponding to the same transmission time based on the transmission of the first PS-poll trigger frame.

In this case, the beacon frame may include information 1500 on the transmission time for transmitting a plurality of PS-poll trigger frame transmitted within the beacon interval. Further, the beacon frame may include information 1520 on the number of a plurality of PS-poll trigger frames transmitted within the beacon interval.

Figure 16:
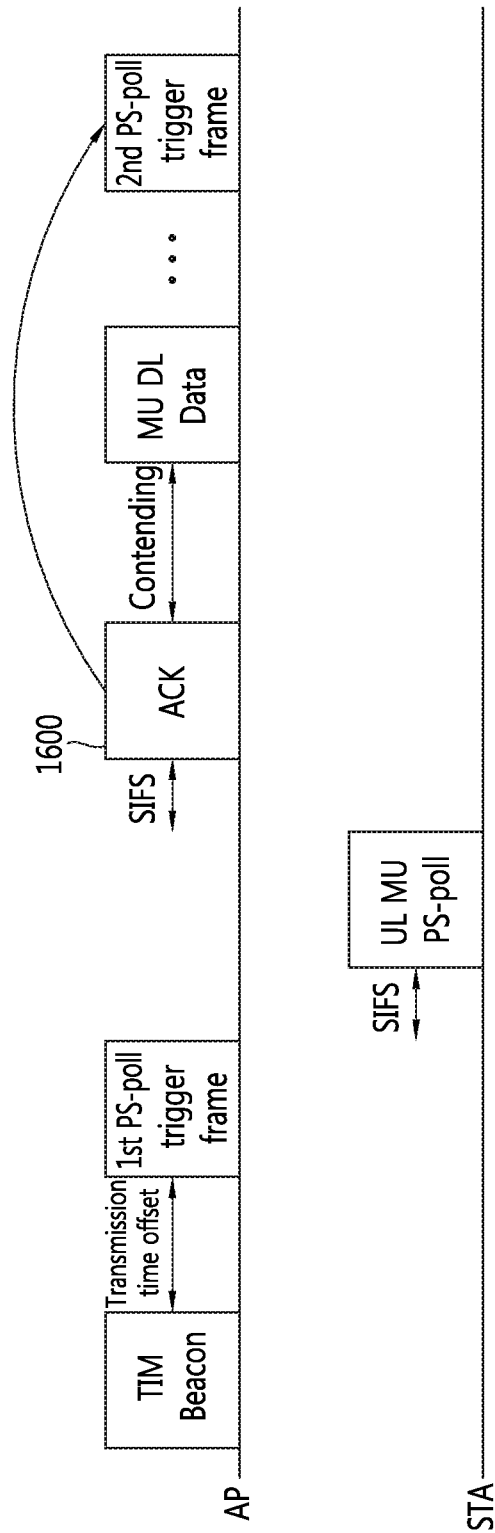
FIG. 16 is a concept diagram illustrating a method of transmitting the PS-poll trigger frame according to an embodiment of the present invention.

FIG. 16 is a concept diagram illustrating a method of transmitting the PS-poll trigger frame according to an embodiment of the present invention.

FIG. 16 discloses transmission of the transmission time offset information through an ACK frame 1600 transmitted by an AP as a response to the PS-poll frame.

Referring to FIG. 16, the beacon frame may include transmission time offset information to indicate the transmission time of the first PS-poll trigger frame to be transmitted after the beacon frame.

The first PS-poll trigger frame may be transmitted based on the inter-frame space of the transmission time offset based on the beacon frame. If the STA receives the first PS-poll trigger frame, the STA may transmit the PS-poll frame to the AP based on the UL MU transmission.

The AP may transmit the ACK frame 1600 as a response to the PS-poll frame. The ACK frame 1600 transmitted by the AP may include transmission time offset information to indicate a transmission time of the second PS-poll trigger frame to be transmitted after the transmission of the first PS-poll trigger frame.

The STA may receive the downlink data frame based on the PS-poll frame from the AP. The STA may transmit the ACK frame 1600 with respect to the downlink frame to the AP.

The STA may be switched to the doze state before transmission of the second PS-poll trigger frame determined based on the transmission time offset information included in the ACK frame 1600 transmitted by the AP. The STA may be switched to the awake state from the doze state by taking into consideration a transmission time point of the second PS-poll trigger frame determined based on the transmission time offset information included in the ACK frame 1600.

Figure 17:
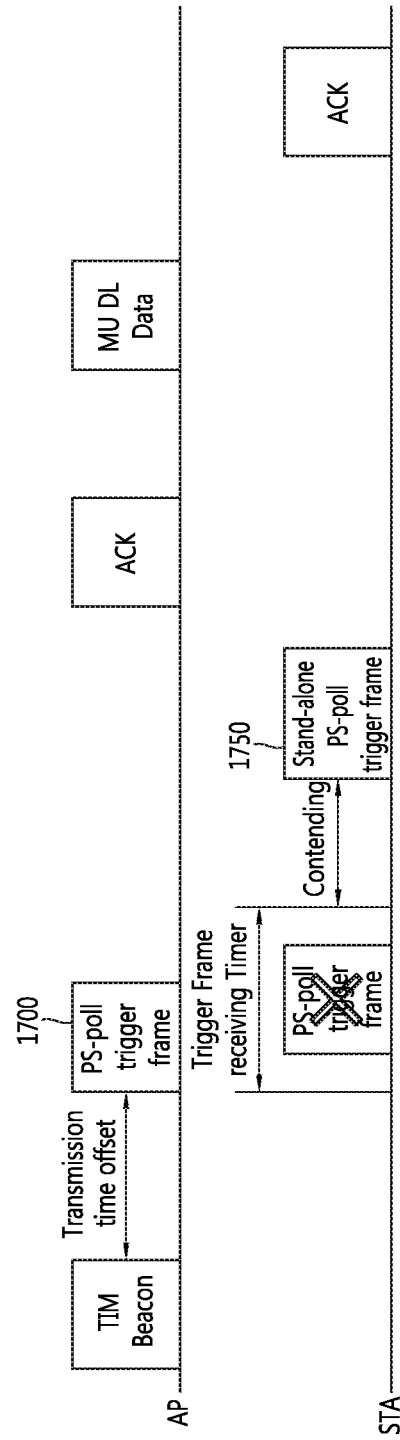
FIG. 17 is a concept diagram illustrating a method of transmitting a PS-poll trigger frame according to an embodiment of the present invention.

FIG. 17 is a concept diagram illustrating a method of transmitting a PS-poll trigger frame according to an embodiment of the present invention.

FIG. 17 discloses an operation of the STA when the STA does not receive the PS-poll trigger frame.

Referring to FIG. 17, the STA may know presence of the pending downlink data with respect to the STA based on the virtual traffic indication bitmap included in the TIM element of the beacon frame.

If there are the pending downlink data, the STA may know the transmission time point of the PS-poll trigger frame 1700 based on the transmission time offset information included in the beacon frame.

The STA may monitor transmission of the PS-poll trigger frame 1700 at a transmission time point of the PS-poll trigger frame 1700. If the STA cannot receive the PS-poll trigger frame 1700, the STA may transmit a stand-alone PS-poll frame 1750. The stand-alone PS-poll frame 1750 may be transmitted based on single user (SU) transmission.

The AP may receive the stand-alone PS-poll frame 1750, and may transmit the ACK frame as a response to the stand-alone PS-poll frame 1750 and may then transmit the downlink data frame including pending downlink data with respect to the STA.

According to an embodiment of the present invention, the STA may defined a timer (trigger frame receiving timer) to indicate a time period for monitoring the PS-poll trigger frame 1700 based on a transmission time point of the PS-poll trigger frame 1700. When the timer is terminated, the STA may stop the monitoring with respect to the transmission of the PS-poll trigger frame 1700 to transmit the stand-alone PS-poll frame 1750 based on the competition based channel access.

Figure 18:
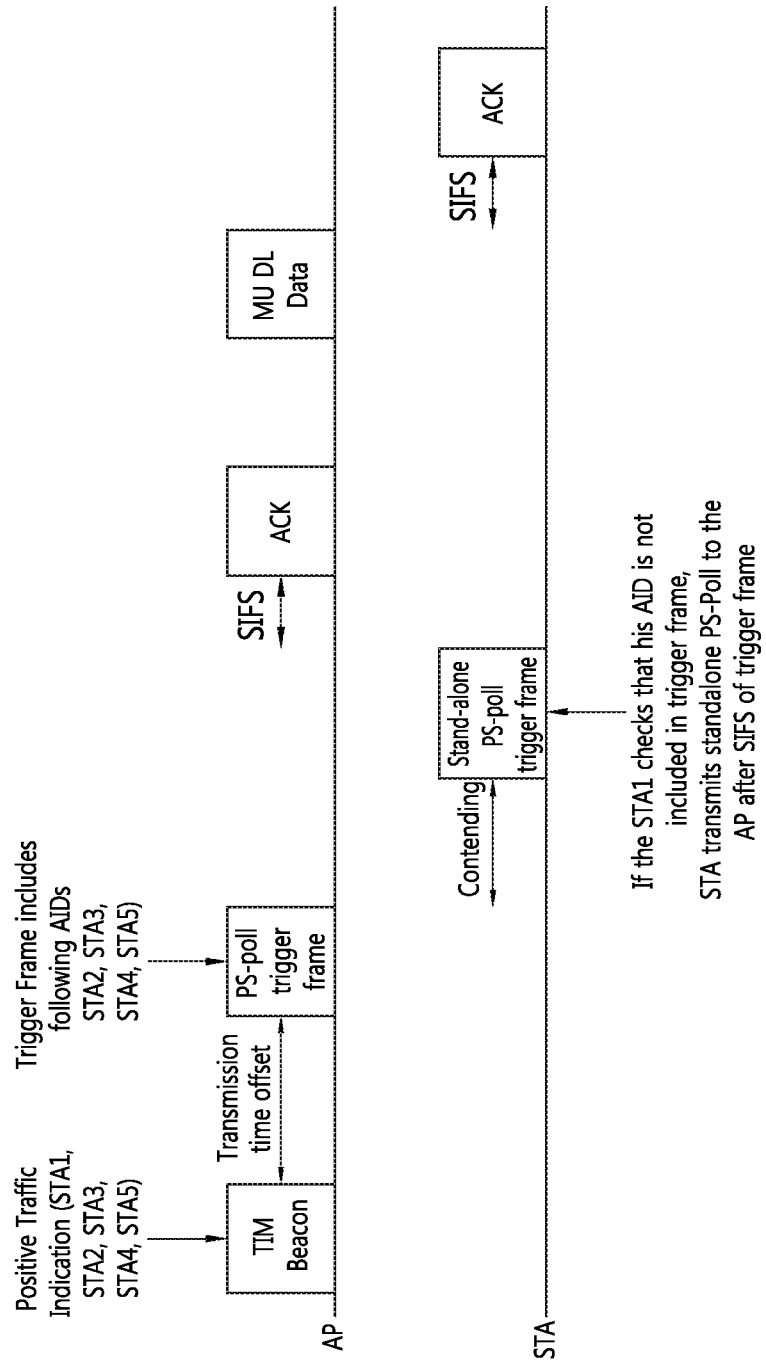
FIG. 18 is a concept diagram illustrating a method of transmitting a PS-poll trigger frame according to an embodiment of the present invention.

FIG. 18 is a concept diagram illustrating a method of transmitting a PS-poll trigger frame according to an embodiment of the present invention.

In FIG. 18 the STA receives the PS-poll trigger frame from the AP. However, when an AID of the STA for triggering transmission of the PS-poll frame of the STA is not included in the PS-poll trigger frame, an operation of the STA starts.

The beacon frame or the PS-poll trigger frame may include identifier information (e.g., AID) for indicating an STA transmitting the PS-poll frame. The STA may determine whether to transmit the PS-poll frame based on the identifier information included in the beacon frame or the PS-poll trigger frame.

Referring to FIG. 18, the STA may receive the beacon frame, and may know presence of the pending downlink data with respect to the STA based on the virtual traffic indication bitmap included in the beacon frame.

For example, the virtual traffic indication bitmap of the beacon frame may indicate presence of the downlink data pending in the STA1, the STA2, the STA3, the STA4, and the STA5, respectively.

The beacon frame and the PS-poll trigger frame having transmission time offset of an inter-frame space may be transmitted by the AP. The PS-poll trigger frame may indicate only the STA2, STA3, STA4, and STA5 as the STA to which the PS-poll frame is transmitted.

The STA1 receives information on presence of the pending downlink data based on the beacon frame but does not receive request of transmission of the PS-poll frame based on the PS-poll trigger frame. In this case, the STA1 may transmit the stand-along PS-poll frame to the AP using the competition based channel access, and may receive the downlink data frame based on the stand-along PS-poll frame.

Figure 19:
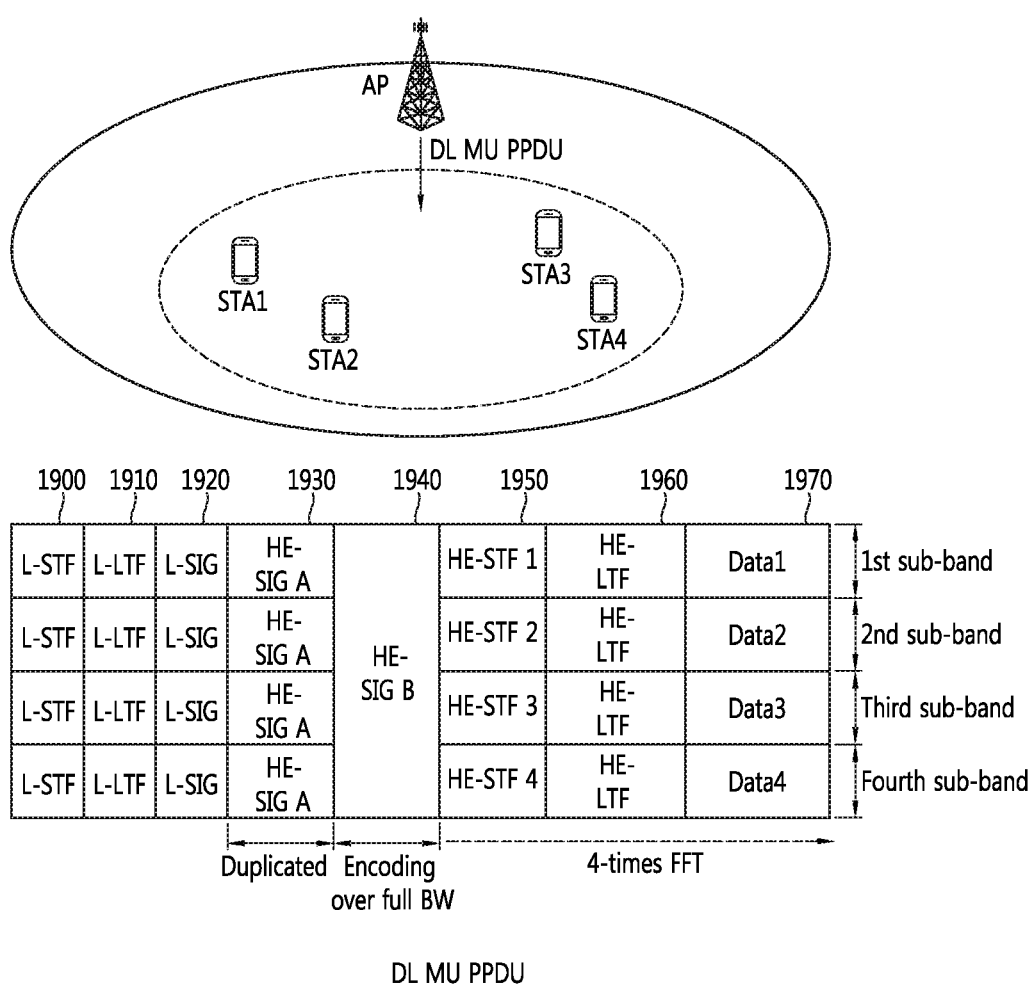
FIG. 19 is a concept diagram illustrating a DL MU PPDU format according to an embodiment of the present invention.

FIG. 19 is a concept diagram illustrating a DL MU PPDU format according to an embodiment of the present invention.

FIG. 19 discloses a DL MU PPDU format transmitted based on an OFDMA by the AP according to an embodiment of the present invention. The DL MU PPDU format may be used to transfer the PS-poll trigger frame, the downlink data frame, and the like.

Referring to FIG. 19, a PPDU header of the DL MU PPDU may include a L-STF (legacy-short training field), a L-LTF (legacy-long training field), a L-SIG (legacy-signal), a HE-SIG A (high efficiency-signal A), a HE-SIG B (high efficiency-signal-B), a HE-STF (high efficiency-short training field), a HE-LTF (high efficiency-long training field), and a data field (or MAC payload). The L-SIG of the PHY header may be divided into a legacy part), and a high efficiency (HE) part after the L-SIG.

The L-STF 1900 may include a short training orthogonal frequency division multiplexing (OFDM) symbol. The L-STF 900 may be used for frame detection, AGC (automatic gain control), diversity detection, and coarse frequency/time synchronization.

An L-LTF 1910 may include a long training orthogonal frequency division multiplexing (01-DM) symbol. An L-LTF 910 may be used for fine frequency/time synchronization and channel estimation.

An L-SIG 1920 may be used to transmit control information. An L-SIG 920 may include information on a data rate and a data length.

A HE-SIG A 1930 may include information for indicating an STA receiving the DL MU PPDU. For example, a HE-SIG A 1930 may include an identifier of a specific STA (or AP) receiving a PPDU and information for indicating a group of specific STAs. Further, when the DL MU PPDU is transmitted based on an OFDMA or a MIMO, the HE-SIG A 1930 may include resource allocation information for receiving the DL MU PPDU of the STA.

In addition, the HE-SIG A 1930 may include color bits information for BSS identifier information, bandwidth information, a tail bit, a CRC bit, modulation and coding scheme (MCS) information on the HE-SIG B 1940, symbol number information for the HE-SIG B 1940, and cyclic prefix (CP) (or guard interval (GI)) length information.

The HE-SIG B 1940 may include information on a length MCS of a Physical layer service data unit (PSDU) with respect to each STA, a tail bit, and the like. Moreover, the HE-SIG B 1940 may include information on the STA receiving the PPDU, and OFDMA based resource allocation information (or MU-MIMO information). When the OFDMA based resource allocation information (or MU-MIMO relation information) is included in the HE-SIG B 1940, the resource allocation information may not be included in the HE-SIG A 1930.

A previous field of the HE-SIG B 1940 on the DL MU PPDU may be transmitted in a duplicated form in each of different transmission resources. In a case of the HE-SIG B 1940, the HE-SIG B 1940 transmitted from some sub-channels (for example, a first sub-channel, a second sub-channel) is an independent field including individual information. The HE-SIG B 1940 transmitted from remaining sub-channels (for example, third sub-channel, fourth sub-channel) may be a format obtained by duplicating the HE-SIG B 1940 transmitted from different sub-channels (for example, a first sub-channel, a second sub-channel). Alternatively, the HE-SIG B 1940 may be transmitted in an encoded form in the whole transmission resource. A field after the HE-SIG B 1940 may include individual information for a plurality of STAs for receiving the PPDU, respectively.

A HE-STF 1950 may be used in order to improve automatic gain control estimation in a multiple input multiple output (MIMO) environment or an OFDMA environment.

In detail, the STA1 may receive the HE-STF1 transmitted through the first sub-band from the AP, and may perform synchronization, channel tracking/estimation, and AGC to decode the first data field. In the same manner, the STA1 may receive the HE-STF2 transmitted through the second sub-band from the AP, and may perform the synchronization, channel tracking/estimation, and AGC to decode the second data field. The STA3 may receive the HE-STF3 transmitted through the third sub-band from the AP, and may perform synchronization, channel tracking/estimation, and AGC to decode the third data field. The STA4 may receive the HE-STF4 transmitted through the fourth sub-band from the AP, and may perform synchronization, channel tracking/estimation, and AGC to decode the fourth data field.

A HE-LTF 1960 may be used in order to estimate a channel in the MIMO environment or the OFDMA environment.

The size of an IFFT applied to the HE-STF 1950 and a field after the HE-STF 1950 may be different from the size of an IFFT applied to a field before the HE-STF 1950. For example, the size of an IFFT applied to the HE-STF 1950 and a field after the HE-STF 1950 may be four times greater than the size of an IFFT applied to a field before the HE-STF 1950. The STA may receive a HE-SIG A 1930, and may receive indication of reception of a downlink PPDU based on the HE-SIG A 1930. In this case, the STA may perform decoding based on the HE-STF 1950 and an FFT size changed after the HE-STF 1950. Conversely, when the STA does not receive the indication of the reception of the downlink PPDU based on the HE-SIG A 1930, the STA may stop the decoding to configure a network allocation vector (NAV). A cyclic prefix (CP) of the HE-STF 1950 may have the size larger than the size of a CP in another field. During a CP time period, the STA may perform decoding with respect to the downlink PPDU by changing the FFT size.

Figure 20:
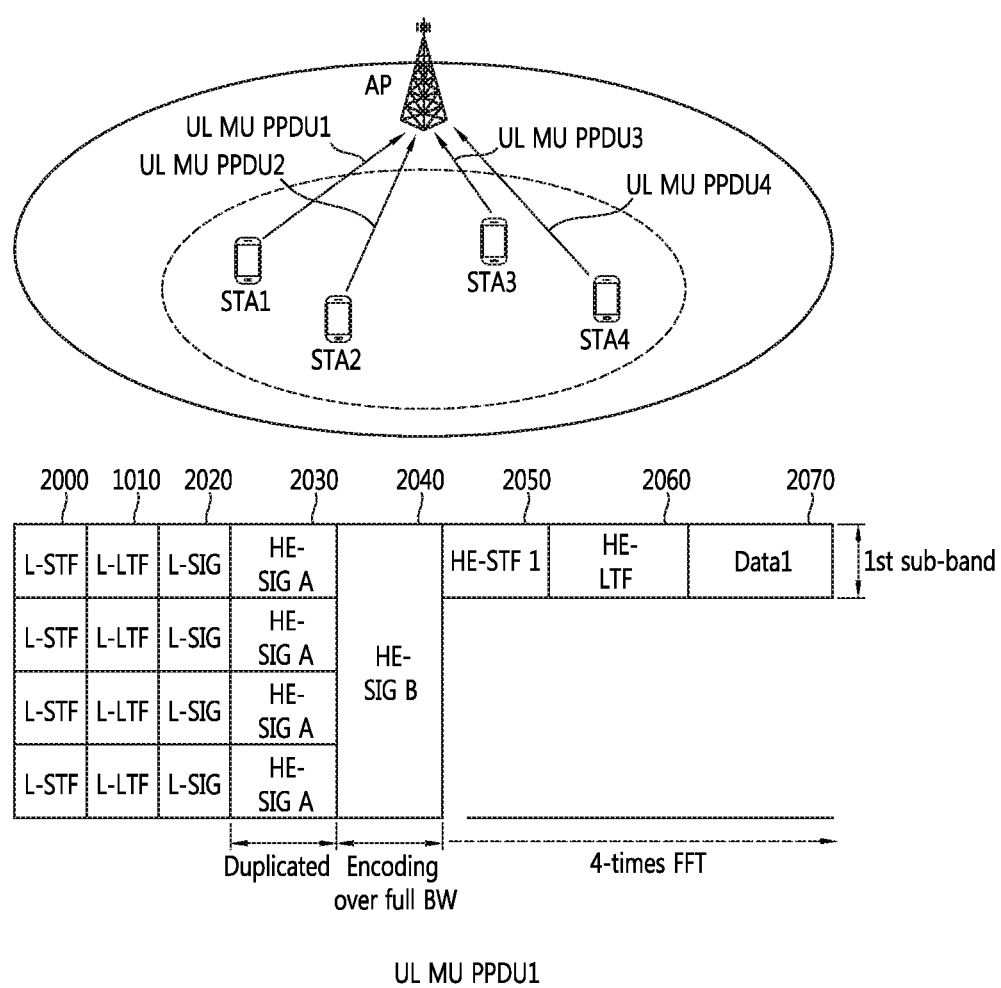
FIG. 20 is a concept diagram illustrating transmission of the UL MU PPDU according to an embodiment of the present invention.

FIG. 20 is a concept diagram illustrating transmission of the UL MU PPDU according to an embodiment of the present invention.

Referring to FIG. 20, a plurality of STAs may transmit a UL MU PPDU to the AP based on a UL MU OFDMA. For example, FIG. 20 discloses only a UL MU PPDU1 transmitted by the STA1. The UL MU PPDU may be transferred to transfer the PS-poll frame and the like.

A L-STF 2000, a L-LTF 2010, a L-SIG 2020, a HE-SIG A 2030, and a HE-SIG B 2040 may perform a function disclosed in FIG. 19. Information included in a signal field (the L-SIG 2020, the HE-SIG A 2030, and the HE-SIG B 2040) may be generated based on information included in the signal field of the received DL MU PPDU.

The STA1 performs uplink transmission through the whole bandwidth to the HE-SIG B 2040. The STA1 may perform uplink transmission through an allocated bandwidth after the HE-STF 2050. The STA1 may transmit the PS-poll frame through the allocated bandwidth (e.g., first sub-band) as a response to the PS-poll trigger frame.

Figure 21:
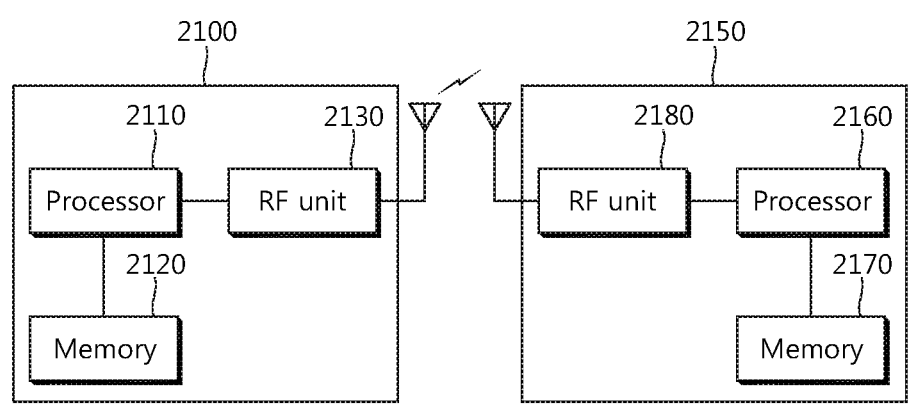
FIG. 21 is a block diagram illustrating a wireless device to which an embodiment of the present invention may apply.

FIG. 21 is a block diagram illustrating a wireless device to which an embodiment of the present invention may apply.

Referring to FIG. 21, an AP 2100 includes a processor 2110, a memory 2120, and an RF (Radio Frequency) unit 2130.

The RF unit 2130 may be connected with the processor 2110 to transmit/receive radio signals.

The processor 2110 implements functions, processes, and/or methods as proposed herein. For example, the processor 2110 may be implemented to perform the operation of the above-described wireless device according to an embodiment disclosed in FIG. 1 to FIG. 21 of the present invention.

For example, a processor 2110 may be configured to transmit the beacon frame, to transmit a first PS-poll trigger frame within the beacon interval, to receive a plurality of first PS-poll frames transmitted based on uplink (UL) multi-user (MU) transmission by a first STA group as a response to the first PS-poll trigger frame and to transmit a plurality of first downlink data frames to a plurality of STAs based on the DL MU transmission as a response to a plurality of first PS-poll frames.

In addition, the processor 2110 may be configured to transmit the second PS-poll trigger frame within the beacon interval, to receive a plurality of second PS-poll frames transmitted based on the UL MU transmission by a second STA group as a response to the second PS-poll trigger frame, and to transmit a plurality of second downlink data frames to a plurality of STAs based on the DL MU transmission as a response to a plurality of second PS-poll frames.

In this case, the beacon frame may include transmission time offset information. The transmission time offset information may include information on the first PS-poll trigger frame transmission time point and the second PS-poll trigger frame transmission time point. Further, the beacon frame may further include a trigger frame indicator bitmap. The trigger frame indicator bitmap may include a plurality of trigger frame indicators. The trigger frame indicator may determine a first STA group and a second STA group.

The beacon frame may further include a virtual traffic indication bitmap. A plurality of positive traffic indication bits included in the virtual traffic indication bitmap may sequentially correspond to a plurality of trigger frame indicators, respectively.

Alternatively, the beacon frame includes the virtual traffic indication bitmap. Respective locations of a plurality of positive traffic indication bits included in the virtual traffic indication bitmap may determine the first STA group and the second STA group.

A STA 2150 includes a processor 2160, a memory 2170, and an RF (Radio Frequency) unit 2180.

The RF unit 2180 may be connected with the processor 2160 to transmit/receive radio signals.

The processor 2160 implements functions, processes, and/or methods as proposed herein. For example, the processor 12160 may be implemented to perform the operation of the above-described wireless device according to an embodiment disclosed in FIG. 1 to FIG. 20 of the present invention.

For example, the processor 2160 may receive the beacon frame or the PS-poll trigger frame to determine whether to transmit UL MU of the PS-poll frame. The processor 2160 may be configured to acquire information on a transmission time point of the PS-poll trigger frame based on transmission time offset included in the beacon frame. Further, the processor 2160 may be configured to determine the PS-poll trigger frame to be received based on the virtual traffic indication bitmap and/or the trigger frame indicator bitmap.

The processor 2110, 2120 may include an ASIC (Application-Specific Integrated Circuit), other chipset, a logic circuit, a data processing device, and/or a converter that performs conversion between a baseband signal and a radio signal. The memory 2120, 2170 may include a ROM (Read-Only Memory), a RAM (Random Access Memory), a flash memory, a memory card, a storage medium, and/or other storage device. The RF unit 2130, 2180 may include one or more antennas that transmit and/or receive radio signals.

When an embodiment is implemented in software, the above-described schemes may be embodied in modules (processes, or functions, etc.) performing the above-described functions. The modules may be stored in the memory 2120, 2170 and may be executed by the processor 2110, 2160. The memory 2120, 2170 may be positioned in or outside the processor 2110, 2160 and may be connected with the processor 2110, 2160 via various well-known means.

What is claimed is:

1. A method in wireless local area network (WLAN), the method comprising:
   receiving, by a station (STA) from an access point (AP), a beacon frame including transmission time offset information related to transmission of a trigger frame,
   wherein the trigger frame is used for triggering uplink multi-user (UL-MU) transmission from a plurality of STA;
   entering, by the STA, a doze state after receiving the beacon frame;
   entering, by the STA, an awake state from the doze state based on the transmission time offset information;
   during the awake state, receiving, by the STA from the AP, the trigger frame based on the transmission time offset information,
   wherein the trigger frame includes association identifiers (AIDs) of the plurality of STAs and frequency resource information used for the UL-MU transmission; and
   in response to the trigger frame, transmitting, by the STA, a power save (PS) poll frame to the AP based on the frequency resource information.

2. The method of claim 1, wherein a plurality of UL frames are simultaneously transmitted from the plurality of STAs to the AP during the UL-MU transmission.

3. The method of claim 1, wherein the transmission time offset information includes time-offset information for the trigger frame.

4. The method of claim 1, wherein the frequency resource information includes a plurality of UL resource fields which are used for the plurality of STAs, respectively.

5. A station (STA) operating in wireless local area network (WLAN), comprising:
   a transceiver configured to transmit and receive a radio signal; and
   a processor configured to control the transceiver,
   wherein the processor is further configured to:
   receive, via the transceiver from an access point (AP), a beacon frame including transmission time offset information related to transmission of a trigger frame,
   wherein the trigger frame is used for triggering uplink multi-user (UL-MU) transmission from a plurality of STAs;
   enter a doze state after receiving the beacon frame;
   enter an awake state from the doze state based on the transmission time offset information;
   during the awake state, receive, via the transceiver from the AP, the trigger frame based on the transmission time offset information,
   wherein the trigger frame includes association identifiers (AIDs) of the plurality of STAs and frequency resource information used for the UL-MU transmission; and
   in response to the trigger frame, transmit via the transceiver a power save (PS) poll frame to the AP based on the frequency resource information.

6. The STA of claim 5, wherein a plurality of UL frames are simultaneously transmitted from the plurality of STAs to the AP during the UL-MU transmission.

7. The STA of claim 5, wherein the transmission time offset information includes time-offset information for the trigger frame.

8. The STA of claim 5, wherein the frequency resource information includes a plurality of UL resource fields which are used for the plurality of STAs, respectively.

* * * * *